US011482230B2

(12) United States Patent
Jeong et al.

(10) Patent No.: US 11,482,230 B2
(45) Date of Patent: Oct. 25, 2022

(54) COMMUNICATION METHOD BETWEEN DIFFERENT ELECTRONIC DEVICES, SERVER AND ELECTRONIC DEVICE SUPPORTING SAME

(71) Applicant: Samsung Electronics Co., Ltd., Suwon-si (KR)

(72) Inventors: Kyungho Jeong, Suwon-si (KR); Seungki Kim, Suwon-si (KR); Hoon Yoon, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 68 days.

(21) Appl. No.: 17/067,604

(22) Filed: Oct. 9, 2020

(65) Prior Publication Data
US 2021/0110834 A1    Apr. 15, 2021

(30) Foreign Application Priority Data

Oct. 11, 2019 (KR) .................. 10-2019-0125870

(51) Int. Cl.
*G10L 17/22* (2013.01)
*G10L 15/08* (2006.01)
*G10L 17/02* (2013.01)
*H04W 12/55* (2021.01)
*H04W 12/65* (2021.01)

(52) U.S. Cl.
CPC ............ *G10L 17/22* (2013.01); *G10L 15/083* (2013.01); *G10L 17/02* (2013.01); *H04W 12/55* (2021.01); *H04W 12/65* (2021.01)

(58) Field of Classification Search
CPC ....... G10L 15/22; G10L 15/083; G10L 17/22; G10L 17/02

USPC ......................................................... 704/275
See application file for complete search history.

(56) References Cited

U.S. PATENT DOCUMENTS 7,840,034 B2    11/2010 Takahashi et al.
10,026,401 B1 *  7/2018 Mutagi ................. G06F 3/167
10,115,400 B2   10/2018 Wilberding
(Continued)

FOREIGN PATENT DOCUMENTS

EP          1865442 A2    12/2007
JP        2018-042061 A    3/2018
KR    10-2019-0096860 A    8/2019

OTHER PUBLICATIONS

International Search Report and Written Opinion of the International Searching Authority dated Jan. 20, 2021 in connection with International Application No. PCT/KR2020/013560, 10 pages.

*Primary Examiner* — Susan I McFadden

(57) ABSTRACT

Disclosed is a server for supporting a communication environment between different electronic devices. The server includes a communication circuit, a memory, and a processor. The processor is electrically connected to the communication circuit and the memory. The processor is configured to receive a first voice signal transmitted from a second electronic device to a first electronic device through the communication circuit. The Processor is also configured to allow the first electronic device to transmit network connection information for connecting with the server to the second electronic device based on whether the first voice signal corresponds to a second voice signal stored in the memory.

20 Claims, 15 Drawing Sheets

(56) References Cited

U.S. PATENT DOCUMENTS

| | | | |
|---|---|---|---|
| 10,127,906 B1* | 11/2018 | Mutagi | H04S 7/40 |
| 10,185,544 B1* | 1/2019 | Mutagi | G06F 3/167 |
| 10,235,997 B2 | 3/2019 | Shah et al. | |
| 10,304,450 B2 | 5/2019 | Tak et al. | |
| 10,332,516 B2 | 6/2019 | Shah et al. | |
| 10,354,658 B2 | 7/2019 | Wilberding | |
| 10,535,343 B2 | 1/2020 | Mixter | |
| 10,560,576 B1* | 2/2020 | Kim | H04M 3/42093 |
| 10,565,998 B2 | 2/2020 | Wilberding | |
| 10,565,999 B2 | 2/2020 | Wilberding | |
| 10,679,623 B2 | 6/2020 | Mixter et al. | |
| 10,798,548 B2* | 10/2020 | Choi | H04L 47/20 |
| 10,825,454 B1* | 11/2020 | Mutagi | G06F 3/167 |
| 10,847,164 B2 | 11/2020 | Wilberding | |
| 10,861,461 B2 | 12/2020 | Tak et al. | |
| 10,887,124 B2 | 1/2021 | Jung | |
| 10,984,802 B2* | 4/2021 | Chiu | G10L 17/06 |
| 11,189,268 B2* | 11/2021 | Park | G10L 15/22 |
| 11,200,897 B2* | 12/2021 | Yi | G10L 15/22 |
| 11,222,636 B2* | 1/2022 | Lee | G10L 15/30 |
| 2007/0286465 A1 | 12/2007 | Takahashi et al. | |
| 2019/0081810 A1 | 3/2019 | Jung | |
| 2019/0259374 A1 | 8/2019 | Kwon et al. | |
| 2019/0279635 A1 | 9/2019 | Shah et al. | |
| 2019/0295555 A1 | 9/2019 | Wilberding | |
| 2020/0184952 A1 | 6/2020 | Kwon et al. | |
| 2021/0075634 A1 | 3/2021 | Jung | |

\* cited by examiner

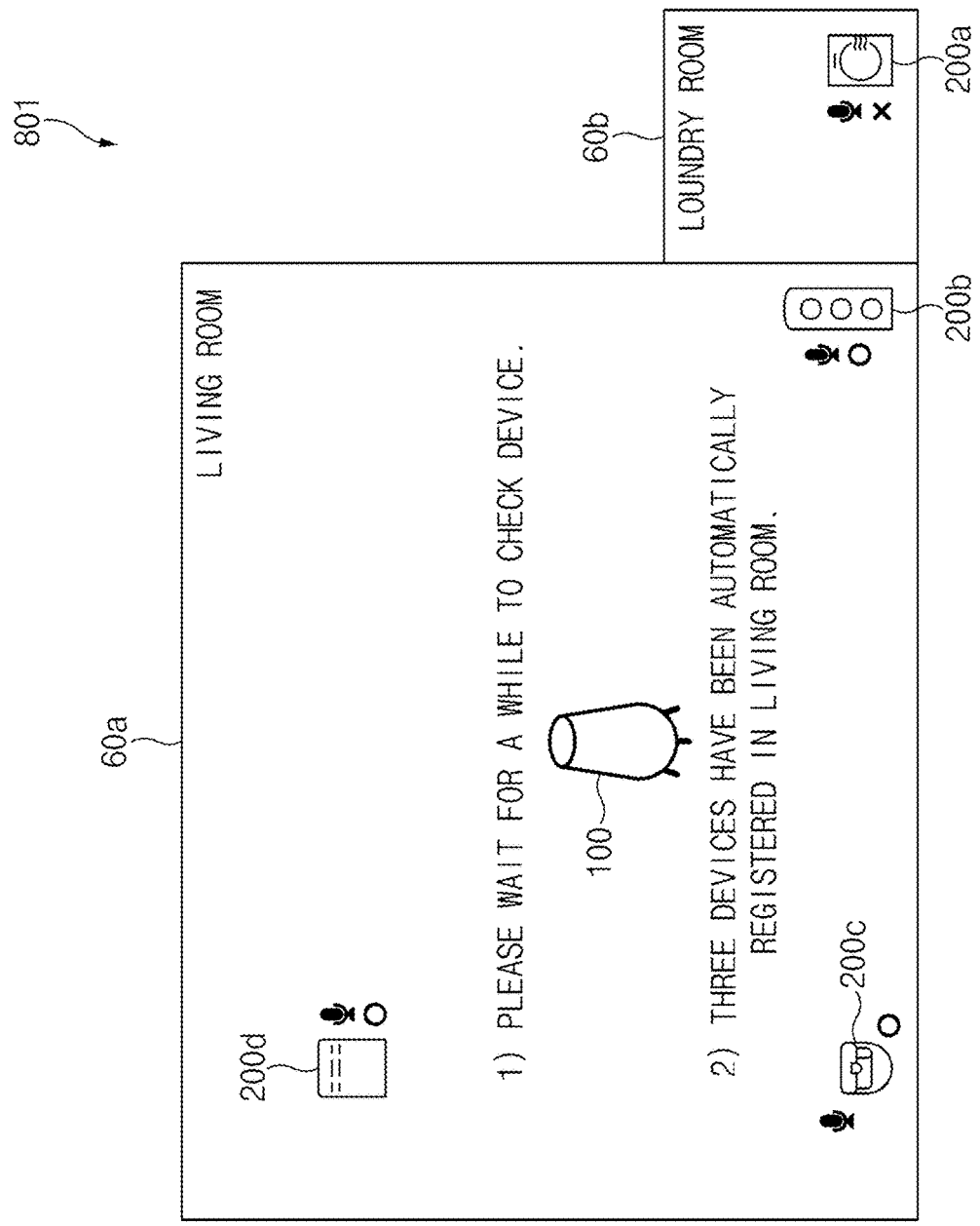

COMMUNICATION METHOD BETWEEN DIFFERENT ELECTRONIC DEVICES, SERVER AND ELECTRONIC DEVICE SUPPORTING SAME

CROSS-REFERENCE TO RELATED APPLICATION

This application is based on and claims priority under 35 U.S.C. § 119 to Korean Patent Application No. 10-2019-0125870 filed on Oct. 11, 2019 in the Korean Intellectual Property Office, the disclosure of which is incorporated by reference herein in its entirety.

BACKGROUND

1. Field

The disclosure relates to a communication technology between different electronic devices.

2. Description of Related Art

In accordance with the commercialization of an intelligent communication infrastructure between objects with communication functions, that is, an Internet of Things (IoT) environment, attempts have been made to establish various operating platforms for the IoT environment. For example, in a conventional IoT environment, by registering an IoT device (e.g., a TV) in an intelligent server, the IoT device may operate under control of an electronic device (e.g., an AI speaker).

The above information is presented as background information only to assist with an understanding of the disclosure. No determination has been made, and no assertion is made, as to whether any of the above might be applicable as prior art with regard to the disclosure.

SUMMARY

In order to register an IoT device (e.g., TV) in an intelligent server, a user may be required to do various actions in response to a command (e.g., audio output) of an electronic device (e.g., an AI speaker). For example, in the case of registering an IoT device in an intelligent server, a user may input a signal (e.g., Power ON) to the IoT device in response to a voice output from an electronic device.

However, when it is repeated several times to register the IoT device to the intelligent server in response to various actions of a user, the registration process may make users cumbersome in building an operating platform for the IoT environment. Moreover, because the registration process requires an operation to move the user's body, it may act as a factor that slows the construction of an operating platform for an IoT environment.

Aspects of the disclosure are to address at least the above-mentioned problems and/or disadvantages and to provide at least the advantages described below. Accordingly, an aspect of the disclosure is to provide a communication method between different electronic devices for registering an IoT device in an intelligent server based on an input corresponding to a user's utterance, and a server and electronic device supporting the same.

In accordance with an aspect of the disclosure, a server for supporting a communication environment between different electronic devices includes a communication circuit, a memory, and a processor electrically connected to the communication circuit and the memory, wherein the processor may receive a first voice signal transmitted from a second electronic device to a first electronic device through the communication circuit, and allow the first electronic device to transmit network connection information for connecting with the server to the second electronic device based on whether the first voice signal corresponds to a second voice signal stored in the memory.

In accordance with another aspect of the disclosure, an electronic device for supporting a communication environment between different electronic devices includes a communication circuit, and a processor electrically connected to the communication circuit, wherein the processor may be configured to transmit a first voice signal received from a second electronic device to a server through the communication circuit, and receive network connection information for connection with the server from the server and transmit the network connection information to the second electronic device based on whether the first voice signal corresponds to a second voice signal stored in a memory of the server.

In accordance with still another aspect of the disclosure, a communication method between different electronic devices includes receiving a first voice signal transmitted from a second electronic device to a first electronic device through a communication circuit, and allowing the first electronic device to transmit network connection information for connecting with the server to the second electronic device based on whether the first voice signal corresponds to a second voice signal stored in a memory.

Other aspects, advantages, and salient features of the disclosure will become apparent to those skilled in the art from the following detailed description, which, taken in conjunction with the annexed drawings, discloses various embodiments of the disclosure.

Before undertaking the DETAILED DESCRIPTION below, it may be advantageous to set forth definitions of certain words and phrases used throughout this patent document: the terms "include" and "comprise," as well as derivatives thereof, mean inclusion without limitation; the term "or," is inclusive, meaning and/or; the phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like; and the term "controller" means any device, system or part thereof that controls at least one operation, such a device may be implemented in hardware, firmware or software, or some combination of at least two of the same. It should be noted that the functionality associated with any particular controller may be centralized or distributed, whether locally or remotely.

Moreover, various functions described below can be implemented or supported by one or more computer programs, each of which is formed from computer readable program code and embodied in a computer readable medium. The terms "application" and "program" refer to one or more computer programs, software components, sets of instructions, procedures, functions, objects, classes, instances, related data, or a portion thereof adapted for implementation in a suitable computer readable program code. The phrase "computer readable program code" includes any type of computer code, including source code, object code, and executable code. The phrase "computer readable medium" includes any type of medium capable of being accessed by a computer, such as read only memory (ROM), random access memory (RAM), a hard disk drive, a compact disc (CD), a digital video disc (DVD), or any other type of memory. A "non-transitory" computer readable medium excludes wired, wireless, optical, or other communication links that transport transitory electrical or other signals. A non-transitory computer readable medium includes media where data can be permanently stored and media where data can be stored and later overwritten, such as a rewritable optical disc or an erasable memory device.

Definitions for certain words and phrases are provided throughout this patent document, those of ordinary skill in the art should understand that in many, if not most instances, such definitions apply to prior, as well as future uses of such defined words and phrases.

BRIEF DESCRIPTION OF THE DRAWINGS

For a more complete understanding of the present disclosure and its advantages, reference is now made to the following description taken in conjunction with the accompanying drawings, in which like reference numerals represent like parts:

FIG. 8B illustrates a diagram of a registration environment of an IoT device according to an embodiment;

DETAILED DESCRIPTION

FIGS. 1 through 9, discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably arranged system or device.

Hereinafter, various embodiments of the disclosure may be described with reference to accompanying drawings. Accordingly, those of ordinary skill in the art will recognize that modification, equivalent, and/or alternative on the various embodiments described herein can be variously made without departing from the scope and spirit of the disclosure.

Figure 1:
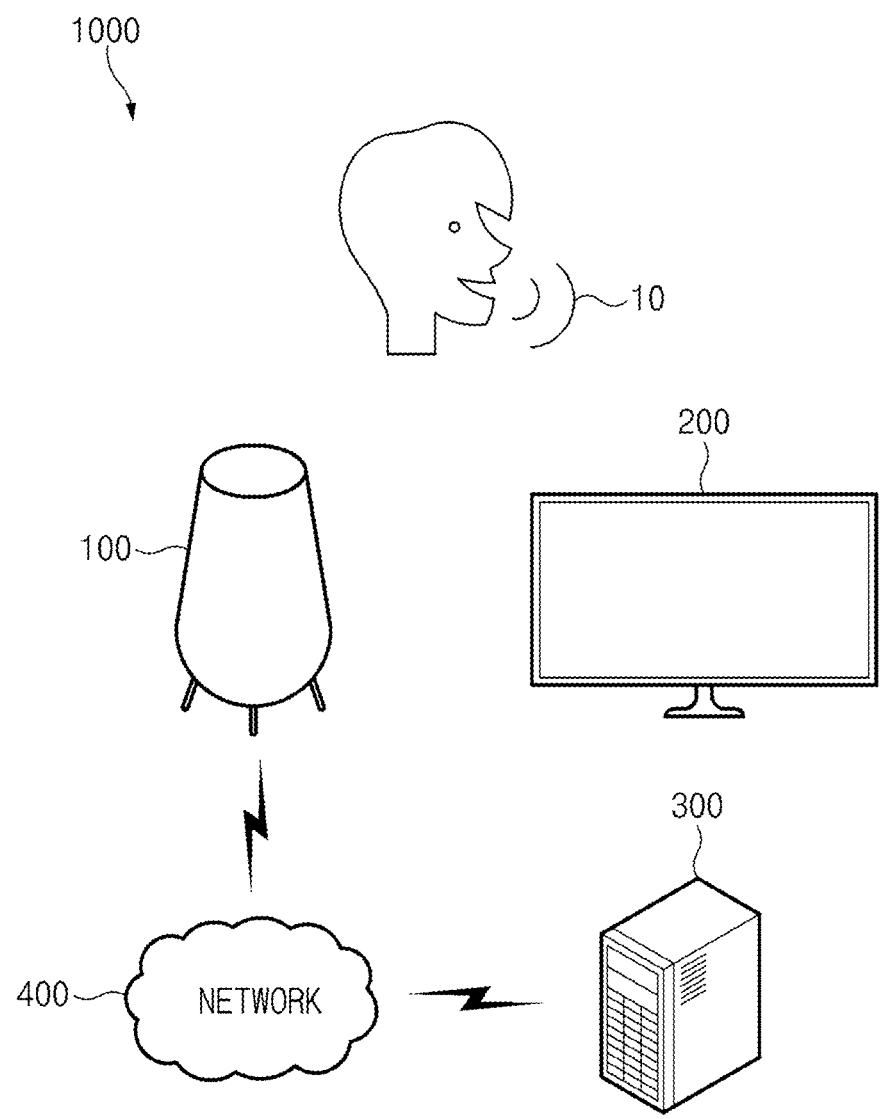
FIG. 1 illustrates an IoT environment according to an embodiment.

FIG. 1 illustrates an IoT environment according to an embodiment.

Referring to FIG. 1, in an IoT environment 1000 according to an embodiment, a first electronic device 100 (e.g., an AI speaker) may use an input corresponding to a user's utterance (e.g., a first voice signal 10) to connect a second electronic device 200 (e.g., an IoT device such as a TV) to an intelligent server 300. In this case, the first electronic device 100 may transmit or receive, through the intelligent server 300 and a network 400, at least one of an input corresponding to a user's utterance, network connection information for connecting the second electronic device 200 and the intelligent server 300, and device identification information.

In various embodiments, the IoT environment 1000 may include the first and second electronic devices 100 and 200, the intelligent server 300, and the network 400. For example, the electronic device 200 may obtain an input corresponding to a user's utterance as the first voice signal 10. Meanwhile, the first electronic device 100 may receive the first voice signal 10 from the second electronic device 200 and transmit the first voice signal 10 to the intelligent server 300. In this case, the first electronic device 100 may transmit identification information of the second electronic device 200 together with the first voice signal 10 to the intelligent server 300. Accordingly, the intelligent server 300 may compare the first voice signal 10 transmitted from the first electronic device 100 with a second voice signal, and allow the first electronic device 100 to transmit network connection information to the second electronic device 200 based on whether the first voice signal 10 corresponds to the second voice signal. In this case, the intelligent server 300 may register the second electronic device 200 in the intelligent server 300 based on whether the first voice signal 10 corresponds to the second voice signal. In addition, the intelligent server 300 may store the second voice signal that is a comparison reference of the first voice signal 10 in a memory.

Figure 2:
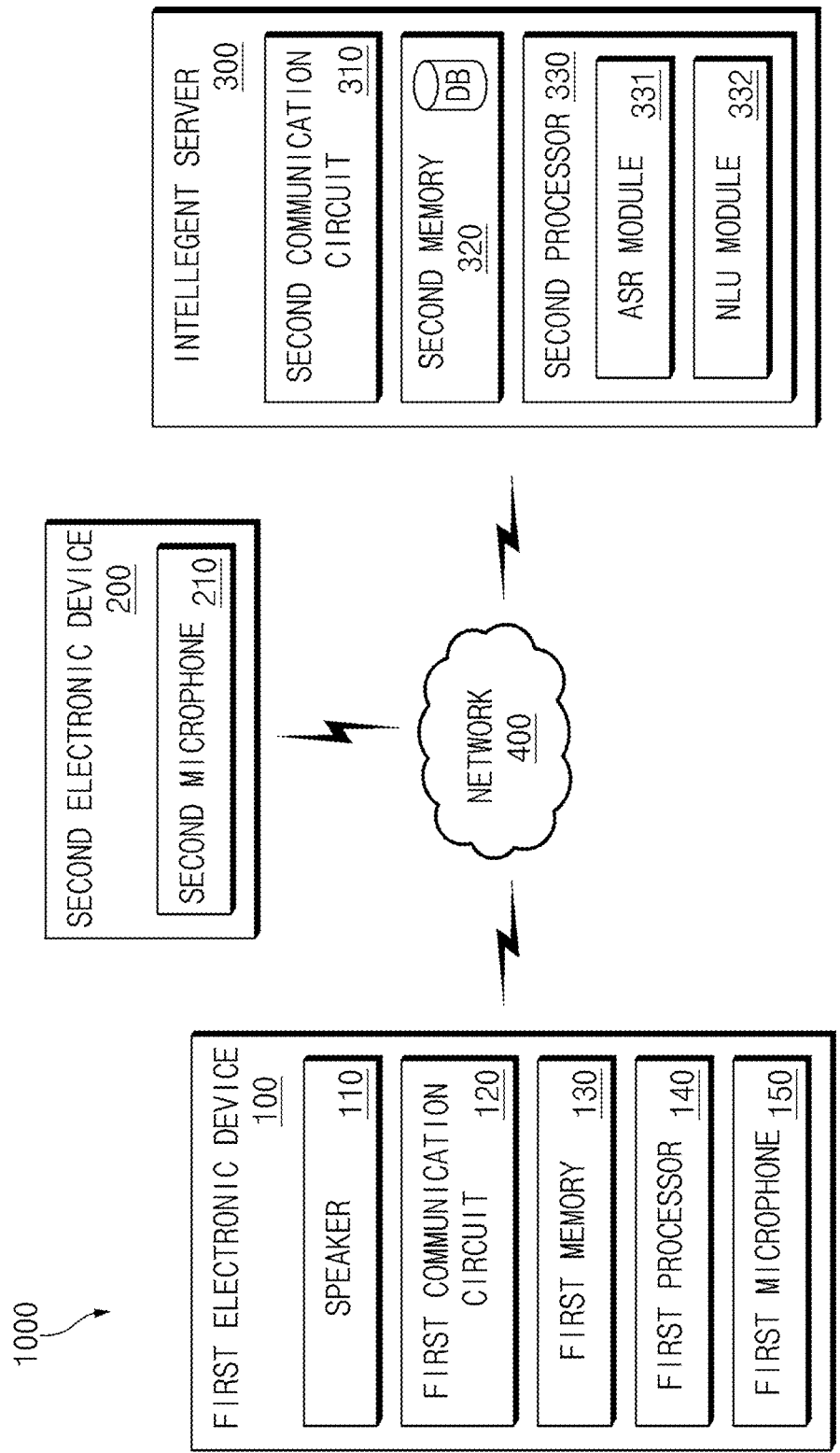
FIG. 2 illustrates components in an IoT environment according to an embodiment.

FIG. 2 illustrates components in an IoT environment according to an embodiment.

Referring to FIG. 2, each of the first and second electronic devices 100 and 200, and the intelligent server 300 in the IoT environment 1000 according to an embodiment may include components. Hereinafter, components included in the IoT environment 1000 will be described.

According to an embodiment, the at least one first electronic device 100 may communicate with at least one second electronic device 200 and the intelligent server 300 through the network 400 (e.g., LAN, WAN, Internet, Ad-Hoc, or a telephone network). For example, the at least one first electronic device 100 may recognize the existence of the second electronic device 200 by using an installed communication function, and connect to the network 400 by performing wired or wireless communication to transmit at least one piece of information (e.g., an input corresponding to a user's utterance and/or device identification information) related to the registration of the second electronic device 200 to the intelligent server 300. The first electronic device 100 may include a speaker 110, a first communication circuit 120, a first memory 130, a first processor 140, and a first microphone 150.

According to an embodiment, the speaker 110 may output specified voice data. For example, when the second electronic device 200 located adjacent to the first electronic device 100 is recognized, the speaker 110 may output a query in the form of a voice stored in the first memory 130. In this case, the speaker 110 may output the query in a voice form to guide the user to utter a voice related to the query to the second electronic device 200. In addition, the speaker 110 may output voice data transmitted from the intelligent server 300 to the first electronic device 100.

In various embodiments, the speaker 110 may include at least one speaker. In addition, at least a part of the speaker 110 may be exposed to an outside of the first electronic device 100 to efficiently output the voice data.

According to an embodiment, the first communication circuit 120 may support a communication function of the first electronic device 100 to allow the first electronic device 100 to communicate with the at least one second electronic device 200 and the intelligent server 300. For example, the first communication circuit 120 may perform wired or wireless communication according to a specified protocol to connect to the network 400 constructed between the at least one second electronic device 200 and the intelligent server 300, thereby transmitting/receiving at least one of data, signals and information related to the operation of the IoT environment 1000.

According to an embodiment, the first memory 130 may store query data to be output from the first speaker 110 during the operation of registering the second electronic device 200. For example, the first memory 130 may store the query data that include at least one of at least one syllable, a word including the at least one syllable, or a sentence including the word. In this case, the query data may be output through the first speaker 110 as a voice related to the first voice signal (e.g., an input corresponding to a user's utterance). As another example, the first memory 130 may store at least one command related to functional operation control of components of the first electronic device 100. As still another example, the first memory 130 may store at least one piece of data related to operation of the first electronic device 100. For example, the first memory 130 may store at least one of identification information (e.g., model information, version information, operating country information, or operating system information) of the first electronic device 100 and location information at which the first electronic device 100 is arranged in the IoT environment 1000.

According to an embodiment, the first processor 140 may control components of the first electronic device 100. For example, the first processor 140 may be electrically or operatively connected to the components of the first electronic device 100 to transmit at least one command related to a functional operation to the components, or perform various operations, data processes and the like.

According to an embodiment, the first processor 140 may recognize the second electronic device 200 at a location adjacent to the first electronic device 100 through the first communication circuit 120. For example, the first processor 140 may recognize the second electronic device 200 adjacent to the first electronic device 100 by scanning a response signal to a signal (e.g., a ping) transmitted from the first communication circuit 120. In this case, the first processor 140 may receive an acknowledgment (ACK) from the second electronic device 200 through the first communication circuit 120. In addition, the first processor 140 may transmit a wake-up signal through the first communication circuit 120 to the second electronic device 200 to activate a microphone (e.g., a second microphone 210) of the second electronic device 200 in response to the acknowledge.

According to an embodiment, the first processor 140 may output specified voice data through the speaker 110. For example, the first processor 140 may output a query in the form of a voice that can be heard by a user through the speaker 110. In this case, the first processor 140 may guide the user to make an utterance corresponding to the voice-type query to the second electronic device 200 which is in a state in which the second microphone 210 is activated.

According to an embodiment, the first processor 140 may receive a first voice signal (e.g., an input corresponding to a user's utterance) transmitted from the second electronic device 200 through the first communication circuit 120. The first processor 140 may transmit the received first voice signal to the intelligent server 300 through the first communication circuit 120. When transmitting the first voice signal to the intelligent server 300, the first processor 140 may transmit device identification information of the second electronic device 200 together.

According to an embodiment, the first processor 140 may receive network connection information from the intelligent server 300 through the first communication circuit 120. For example, the first processor 140 may transmit network connection information to the second electronic device 200 through the first communication circuit 120 to allow the second electronic device 200 to be connected to the intelligent server 300.

According to an embodiment, the first processor 140 may obtain the first voice signal (e.g., an input corresponding to a user's utterance) through the first microphone 150. For example, when the first voice signal is obtained through the first microphone 150, the first processor 140 may transmit the first voice signal obtained through the first microphone 150 and the first voice signal received from the second electronic device 200 to the intelligent server 300 together.

In various embodiments, the first processor 140 may be at least one of a central processing unit, an application processor, and a communication processor.

According to an embodiment, the first microphone 150 may receive the first voice signal (e.g., an input corresponding to a user's utterance). For example, the first microphone 150 may always operate in a driven state (e.g., always turned on) to receive the first voice signal. As another example, the first microphone 150 may be activated and operated in response to a user input to a button arranged in one area of the first electronic device 100.

In various embodiments, there may be at least one first microphone 150. As another example, at least a part of the first microphone 150 may be exposed to an outside thereof for efficient reception of the first voice signal.

In various embodiments, the at least one first electronic device 100 may be a hub device or an AI (Artificial Intelligence) device for relaying between the second electronic device 200 (or a user) and the intelligent server 300. In this regard, the at least one first electronic device 100 may be arranged in at least a portion of at least one space that is physically or logically defined within a specific area in which the IoT environment 1000 is formed.

In various embodiments, the at least one first electronic device 100 may omit at least one of the above-described components, or may additionally include other components. For example, the at least one first electronic device 100 may further include a battery that supplies power to the above-described components or a display that outputs various contents.

According to an embodiment, the at least one second electronic device 200 may be registered in the IoT environment 1000 or the intelligent server 300 through a series of registration processes to be described later. For example, in the registration process, the at least one second electronic device 200 may transmit the first voice signal and identification information of a corresponding device (e.g., model information, version information, operating country information, or operating system information) to the first electronic device 100 in response to the request of the first electronic device 100. In this case, the at least one second electronic device 200 may transmit a response (e.g., acknowledge) to a signal (e.g., a ping) transmitted from the first electronic device 100 to the first electronic device 100, and thus, receive a wake-up signal from the first electronic device 100, so that the second microphone 210 is activated. The second microphone 210 may receive, for example, the first voice signal corresponding to a user's utterance.

In various embodiments, when the at least one second electronic device 200 receives network connection information from the intelligent server 300 through the first electronic device 100, the at least one second electronic device 200 may be connected to the intelligent server 300 through an access point (e.g., a Wi-Fi router).

In various embodiments, the at least one second electronic device 200 may transmit various operation information (e.g., state information, function information, and the like) in the form of a batch or a stream to the intelligent server 300, the at least one first electronic device 100, or a mobile communication terminal of a user. As another example, the second electronic device 200 may be an IoT technology-based service target (e.g., an electronic product).

According to an embodiment, the intelligent server 300 may integrate and manage the at least one second electronic device 200 registered in the IoT environment 1000 or the intelligent server 300. For example, the intelligent server 300 may communicate with the at least one first electronic device 100 to perform a process of registering the second electronic device 200 arranged in the IoT environment 1000. As another example, the intelligent server 300 may receive the first voice signal (e.g., an input corresponding to a user's utterance) related to operation of the at least one second electronic device 200 from the at least one first electronic device 100, and analyze the first voice signal to process an input corresponding to a user's utterance. The intelligent server 300 may include a second communication circuit 310, a second memory 320, and a second processor 330.

According to an embodiment, the second communication circuit 310 may support the communication function of the intelligent server 300 such that the intelligent server 300 communicates with the at least one first electronic device 100 and the at least one second electronic device 200. For example, the second communication circuit 310 may be connected to the network 400 established between the at least one first electronic device 100 and the at least one second electronic device 200 by performing wired or wireless communication based on a specified protocol, such that data, a signal and information related to the operation of the IoT environment 1000 may be transmitted/received.

According to an embodiment, the second memory 320 may store the second voice signal that is a reference to be compared with the at least one first voice signal received from the at least one first electronic device 100. For example, the second memory 320 may store the second voice signal corresponding to at least one of at least one syllable, a word including at least one syllable, or a sentence including a word. As another example, the second memory 320 may store at least one user account. For example, the second memory 320 may store voice information corresponding to each of at least one user account. In this case, the voice information corresponding to the user account may be used as information for identifying a user's voice. As still another example, the second memory 320 may store device identification information (e.g., model information, version information, operating country information, operating system information, and the like) and location information of each of the at least one first electronic device 100 transmitted from the at least one first electronic device 100 or a user-owned mobile communication terminal through the second communication circuit 310. As still another example, the second memory 320 may store a second sound wave signal (e.g., an ultrasonic signal that a user cannot hear).

In various embodiments, the second memory 320 may include a database 322 in which various pieces of information of the second memory 320 are structured. For example, the database 322 may store information about at least one account and a first mapping table related to identification information of the second electronic device 200 corresponding to the account information. As another example, the database 322 may store the at least one first electronic device 100 and a second mapping table related to identification information of the second electronic device 200 corresponding to the first electronic device 100. For example, the first mapping table and the second mapping table may be the same as or similar to following Table 1 and Table 2.

TABLE 1

<First mapping table>

| User account information | Second electronic device information |
|---|---|
| First user account | Identification information of TV, Identification information of washing machine |

TABLE 2

<Second mapping table>

| Electronic device information | Second electronic device information |
|---|---|
| First AI speaker | Identification information of vacuum cleaner, Identification information of air purifier |

According to an embodiment, the second processor 330 may control components of the intelligent server 300. For example, the second processor 330 is electrically or operatively connected to the components of the intelligent server 300 to transmit at least one command related to a functional operation to the components or to perform various operations, data processing, and the like.

According to an embodiment, the second processor 330 may receive a first voice signal (e.g., an input corresponding to a user's utterance) transmitted from the first electronic device 100 through the second communication circuit 310. In addition, the second processor 330 may receive identification information of the second electronic device 200 transmitted from the first electronic device 100 through the second communication circuit 310. The second processor 330 may compare the received first voice signal with the second voice signal of the second memory 320 to determine whether the received first voice signal corresponds to the second voice signal. For example, the second processor 330 may transmit network connection information to the first electronic device 100 through the second communication circuit 310 when the first voice signal corresponds to the second voice signal. In this case, the second processor 330 may register the second electronic device 200 in the intelligent server 300 as a new IoT device.

According to an embodiment, the second processor 330 may detect feature information (e.g., a frequency on the basis of which a user's voice can be distinguished) of the first voice signal (e.g., an input corresponding to a user's utterance) transmitted from the first electronic device 100 through the second communication circuit 310. In addition, the second processor 330 may compare the feature information with voice information of a user account stored in the second memory 320 to determine whether they correspond to each other. For example, when the feature information corresponds to the voice information, the second processor 330 may register the identification information of the second electronic device 200 received together with the first voice signal including the feature information in the first mapping table (e.g., the first mapping table of Table 1) in association with the user account.

According to an embodiment, the second processor 330 may receive two first voice signals (e.g., an input corresponding to a user's utterance) transmitted from the first electronic device 100 through the second communication circuit 310. In this case, the two first voice signals may be obtained from each of the first and second electronic devices 100 and 200. In addition, the second processor 330 may receive identification information of the second electronic device 200 transmitted from the first electronic device 100 through the second communication circuit 310. The second processor 330 may compare the received two first voice signals with the second voice signal of the second memory 320 to determine whether they correspond to each other. For example, when the two first voice signals correspond to the second voice signal, the second processor 330 may associate the received identification information of the second electronic device 200 with the first electronic device 100 to register the identification information in a second mapping table (e.g., the second mapping table of Table 2).

According to an embodiment, the second processor 330 may receive a first sound wave signal (e.g., an ultrasonic signal transmitted from the first electronic device 100) transmitted from the first electronic device 100 through the second communication circuit 310. In addition, the second processor 330 may receive identification information of the second electronic device 200 transmitted from the first electronic device 100 through the second communication circuit 310. The second processor 330 may compare the received first sound wave signal with the second sound wave signal of the second memory 320 to determine whether they correspond to each other. For example, when the first sound wave signal corresponds to the second sound wave signal, the second processor 330 may transmit network connection information to the first electronic device 100 through the second communication circuit 310. In this case, the second processor 330 may register the second electronic device 200 in the intelligent server 300 as a new IoT device.

According to an embodiment, the second processor 330 may analyze and process voice data of a user utterance input received from the first electronic device 100 through the second communication circuit 310. For example, the user utterance input may include a command or intention related to the operation of the second electronic device 200 adjacent to the first electronic device 100 (or existing in the same space). In relation to the analysis and processing of utterance data according to the user utterance input, the second processor 330 may include an automatic utterance recognition (ASR) module 331 and a natural language understanding (NLU) module 332. In various embodiments, the ASR module 331 and the NLU module 332 may be independent of each other, or at least some may be integrated.

According to an embodiment, the ASR module 331 may recognize voice data received from the first electronic device 100 and convert the voice data into text data. For example, the ASR module 331 may convert utterance data into text data by using an acoustic model included in at least one piece of information related to utterance or a language model including combination information of phonemes.

According to an embodiment, the NLU module 332 may derive an intention of a user utterance input related to voice data based on the text data transmitted from the ASR module 331. For example, the NLU module 332 may divide text data into grammatical units (e.g., words, phrases, or morphemes), and determines the meaning of the text data by analyzing grammatical elements or linguistic features of each unit, such that it is possible to derive the intention of the user utterance input related to the voice data.

In various embodiments, the first processor 140 may be at least one of a central processing unit, an application processor, and a communication processor.

Figure 3:
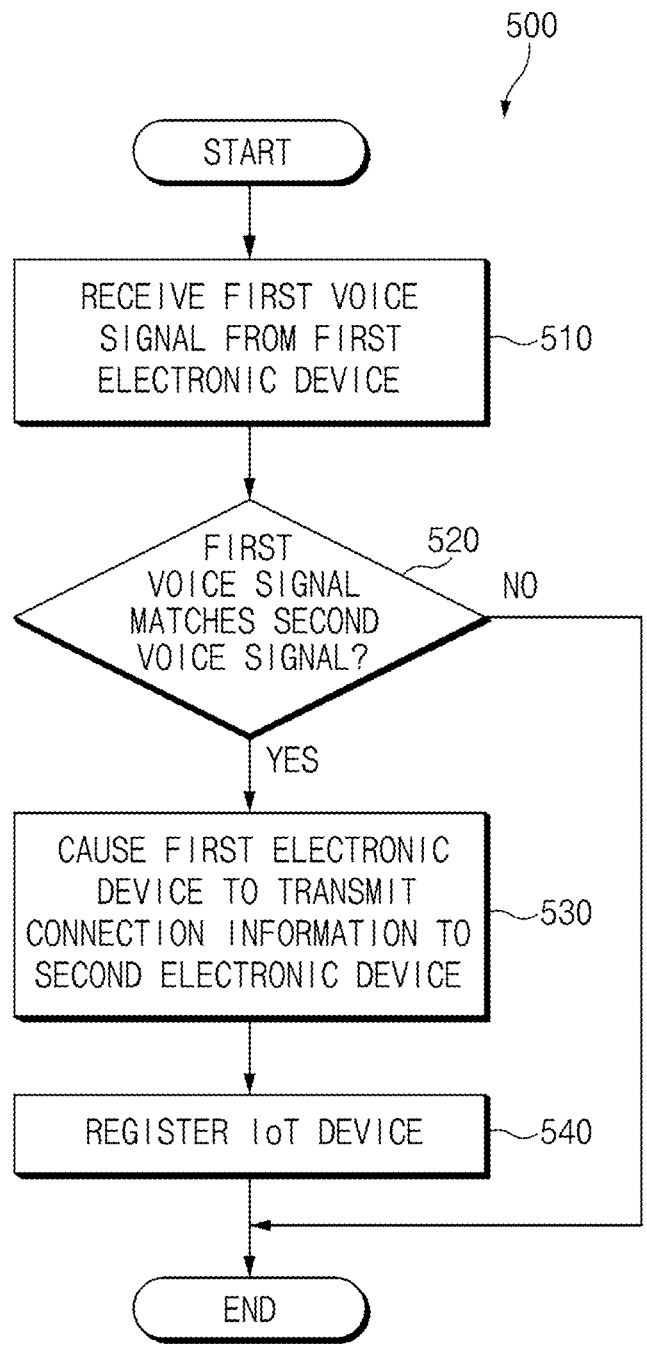
FIG. 3 illustrates a flowchart of process of registering an IoT device according to an embodiment.

FIG. 3 illustrates a flowchart of a process of registering an IoT device according to an embodiment.

Referring to FIG. 3, in an IoT environment (e.g., the IoT environment 1000 of FIG. 1 or 2) according to an embodiment, an intelligent server (e.g., the intelligent server 300 of FIG. 1 or FIG. 2) may communicate with a first electronic device (e.g., the first electronic device 100 of FIG. 1 or 2) through the network 400 (e.g., the network 400 of FIG. 1 or 2) to perform a registration process 500 of a second electronic device (e.g., the second electronic device 200 of FIG. 1 or 2).

Referring to operation 510, the intelligent server 300 according to an embodiment may receive a first voice signal (e.g., an input corresponding to a user's utterance) from the first electronic device 100. In this case, the first voice signal may be a first voice signal obtained from the second electronic device 200.

Referring to operation 520, the intelligent server 300 according to an embodiment may compare the first voice signal received from the first electronic device 100 with a second voice signal stored in a second memory (e.g., the second memory 320 of FIG. 2). For example, in operation 520, the intelligent server 300 may execute operation 530 when the first voice signal corresponds to the second voice signal. As another example, in operation 520, when the first voice signal does not correspond to the second voice signal, the intelligent server 300 may terminate the operation.

Referring to operation 530, the intelligent server 300 according to an embodiment may cause the first electronic device 100 to transmit network connection information to the second electronic device 200.

Referring to operation 540, the intelligent server 300 according to an embodiment may register the second electronic device 200 that has transmitted the first voice signal to the first electronic device 100 as a new IoT device.

In various embodiments, operation 540 may precede operation 530. In addition, operation 530 may be performed after operation 540.

Figure 4A:
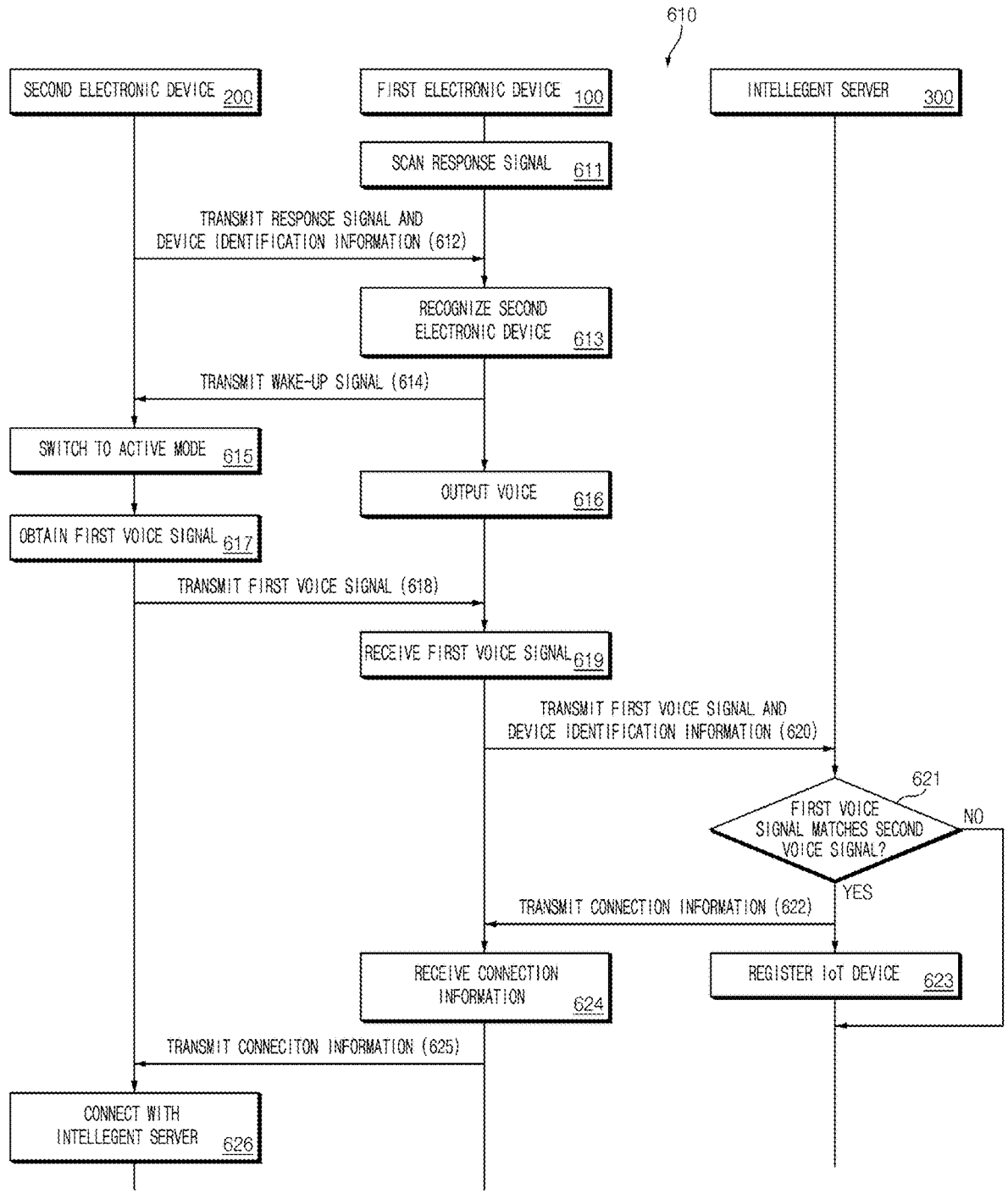
FIG. 4A illustrates a diagram of a process of registering an IoT device according to an embodiment.

FIG. 4A illustrates a diagram of a process of registering an IoT device according to an embodiment. At least one of the components of an IoT environment (e.g., the IoT environment 1000 shown in FIG. 2) shown in FIG. 4A is the same as or similar to at least one of the components of the first and second electronic devices 100 and 200, and the intelligent server 300 shown in FIG. 2, and redundant descriptions will be omitted below.

Referring to FIG. 4A, in the registration process 610 of an IoT device according to an embodiment, the intelligent server 300 may register the second electronic device 200 in response to a first voice signal (e.g., an input corresponding to a user's utterance) transmitted from the second electronic device 200 through the first electronic device 100.

Referring to operation 611, the first electronic device 100 according to an embodiment may scan a response signal of the second electronic device 200 in order to recognize the second electronic device 200 located adjacent to the first electronic device 100. For example, the first electronic device 100 may recognize the second electronic device 200 adjacent to the first electronic device 100 by scanning a response signal to a signal (e.g., a ping) transmitted from the first electronic device 100.

Referring to operation 612, the second electronic device 200 according to an embodiment may transmit at least one of the response signal and device identification information to the first electronic device 100. For example, the second electronic device 200 may transmit an acknowledgment (ACK) to the first electronic device 100 in response to a signal (e.g., a ping) transmitted from the first electronic device 100.

Referring to operation 613, the first electronic device 100 according to an embodiment may recognize the second electronic device 200 by receiving an acknowledgment to the response signal scanning from the second electronic device 200. For example, the first electronic device 100 may be connected to the second electronic device 200 through Bluetooth communication.

Referring to operation 614, the first electronic device 100 according to an embodiment may transmit a wake-up signal to the second electronic device 200 to activate a microphone (e.g., the second microphone 210 of FIG. 2) of the second electronic device 200 in response to the acknowledgment received from the second electronic device 200.

Referring to operation 615, in the second electronic device 200 according to an embodiment, the microphone 210 may be switched to an activation mode in response to a wake-up signal received from the first electronic device 100.

Referring to operation 616, the first electronic device 100 according to an embodiment may output specified voice data. In this case, the first electronic device 100 may guide the user to utter a voice related to the voice form to the second electronic device 200 by outputting a voice query.

Referring to operation 617, the second electronic device 200 according to an embodiment may obtain a first voice signal from a user. In this case, the second electronic device 200 may obtain an input corresponding to a user's utterance as the first voice signal.

Referring to operation 618, the second electronic device 200 according to an embodiment may transmit the obtained first voice signal to the first electronic device 100. In this case, the second electronic device 200 may further transmit device identification information of the second electronic device 200 to the first electronic device 100.

Referring to operation 619, the first electronic device 100 according to an embodiment may receive the first voice signal from the second electronic device 200. In this case, the first electronic device 100 may further receive the device identification information of the second electronic device 200 from the second electronic device 200.

Referring to operation 620, the first electronic device 100 according to an embodiment may transmit the first voice signal and the device identification information to the intelligent server 300.

Referring to operation 621, the intelligent server 300 according to an embodiment may determine whether the first voice signal received from the first electronic device 100 corresponds to the second voice signal stored in a memory (e.g., the second memory 320 of FIG. 2). For example, in operation 621, when the first voice signal corresponds to the second voice signal, the intelligent server 300 may execute operations 622 and 623. As another example, in operation 621, when the first voice signal does not correspond to the second voice signal, the intelligent server 300 may terminate the operation.

Referring to operation 622, the intelligent server 300 according to an embodiment may transmit network connection information to the first electronic device 100.

Referring to operation 623, the intelligent server 300 according to an embodiment may register the second electronic device 200 that has transmitted the first voice signal to the first electronic device 100 as a new IoT device. In this case, the intelligent server 300 may store the device identification information of the second electronic device 200 received from the first electronic device 100 in the second memory 320.

Referring to operation 624, the first electronic device 100 according to an embodiment may receive network connection information from the intelligent server 300.

Referring to operation 625, the first electronic device 100 according to an embodiment may transmit the network connection information to the second electronic device 200.

Referring to operation 626, the second electronic device 200 according to an embodiment may be connected to the intelligent server 300 by using the network connection information received from the first electronic device 100. In this case, the second electronic device 200 may be connected to the intelligent server 300 through an access point (e.g., a Wi-Fi router).

Figure 4B:
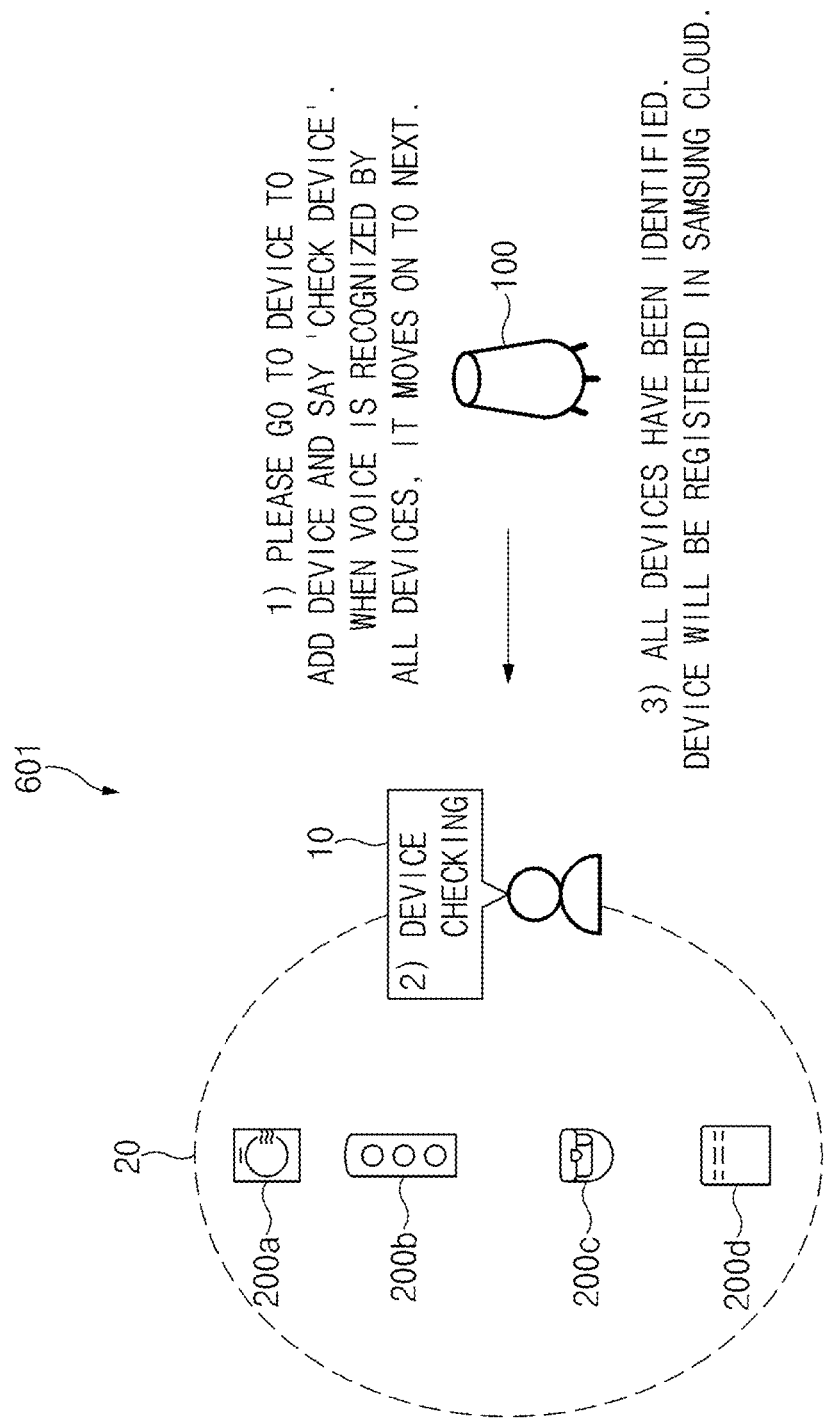
FIG. 4B illustrates a diagram of a registration environment of an IoT device according to an embodiment.

FIG. 4B illustrates a diagram of a registration environment of an IoT device according to an embodiment.

Referring to FIG. 4B, in a registration environment 601 of an IoT device according to an embodiment, the first electronic device 100 may guide a user to utter a voice to the second electronic device 200, and in response to the voice, cause a second electronic device 200*a*, 200*b*, 200*c*, or 200*d* to be registered in an intelligent server (e.g., the intelligent server 300 of FIGS. 1 to 3).

According to an embodiment, the first electronic device 100 may output a query in a voice form to guide a user to utter a voice related to the voice form to the second electronic device 200*a*, 200*b*, 200*c* or 200*d*. For example, the first electronic device 100 may output, to the user, a prompt voice "Please go to the device to add the device and say 'Check device'. When the voice is recognized by all devices, it moves on to the next."

According to an embodiment, the second electronic device 200*a*, 200*b*, 200*c*, or 200*d* may obtain a voice uttered by a user as the first voice signal 10. In this case, the second electronic device 200*a*, 200*b*, 200*c*, or 200*d* may be in a state in which a microphone (e.g., the second microphone 210 of FIG. 2) is activated in response to a command of the first electronic device 100. In addition, the second electronic device 200*a*, 200*b*, 200*c*, or 200*d* may transmit the first voice signal 10 to the first electronic device 100. For example, when a voice "device checking" is uttered by the user, the second electronic device 200*a*, 200*b*, 200*c* or 200*d* may obtain the voice as the first voice signal 10.

According to an embodiment, when it is identified that the first voice signal 10 received from the second electronic device 200*a*, 200*b*, 200*c* or 200*d* corresponds to the second voice signal (see operation 621 of FIG. 4A), the first electronic device 100 may register the second electronic device 200a, 200b, 200c, or 200d arranged in one space in a specific area 20 in the intelligent server 300. For example, when it is identified that the first voice signal 10 received from the second electronic device 200a, 200b, 200c or 200d corresponds to the second voice signal, the first electronic device 100 may output, to a user, a prompt voice "All devices have been identified. The device will be registered."

Figure 4C:
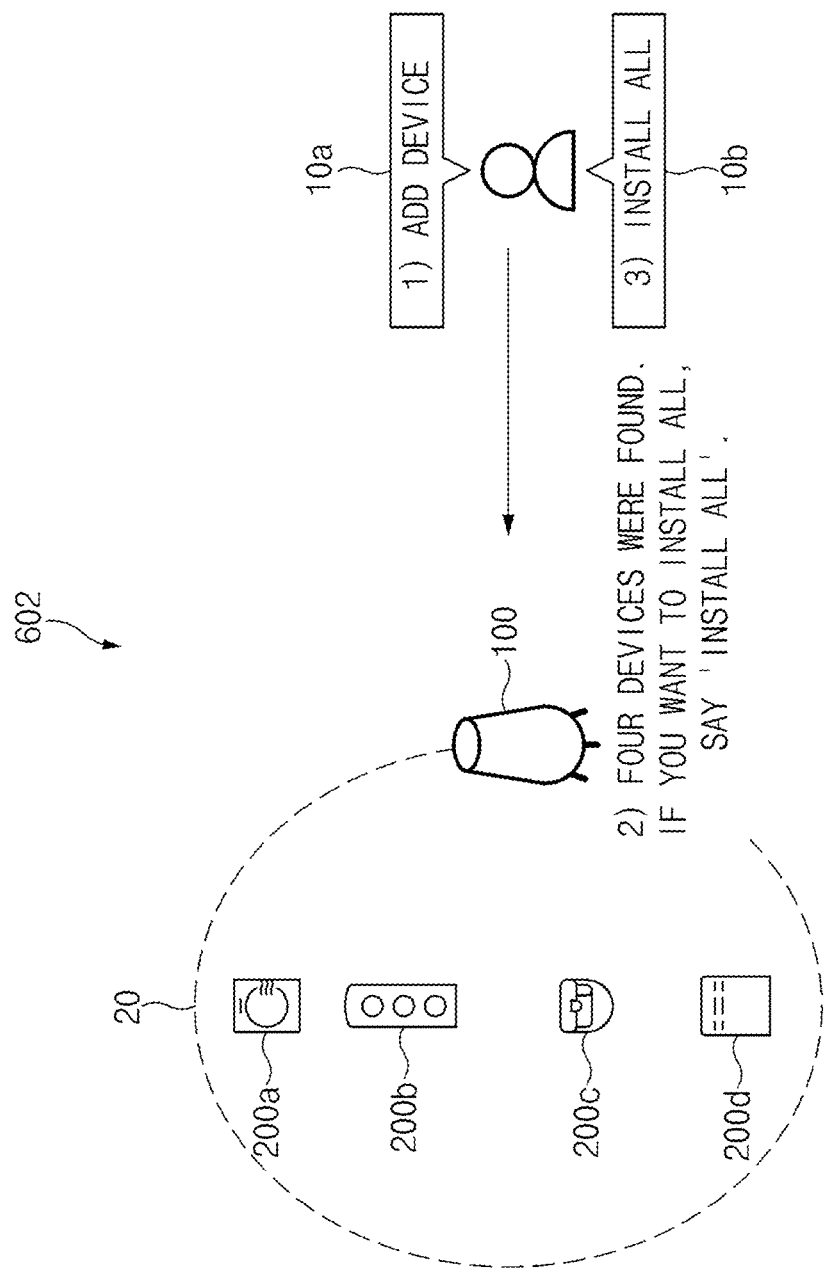
FIG. 4C illustrates a diagram of a registration environment of an IoT device according to another embodiment.

FIG. 4C illustrates a diagram of a registration environment of an IoT device according to another embodiment.

Referring to FIG. 4C, in a registration environment 602 of an IoT device according to an embodiment, when a user requests the registration of the second electronic device 200a, 200b, 200c or 200d, the first electronic device 100 may cause the second electronic device 200a, 200b, 200c, or 200d to be registered in an intelligent server (e.g., the intelligent server 300 of FIGS. 1 to 3) in response to the user's voice.

According to an embodiment, when the registration of the second electronic device 200a, 200b, 200c or 200d is requested from the user, the first electronic device 100 may recognize the second electronic device 200a, 200b, 200c or 200d (see operation 613 of FIG. 4A). In addition, the first electronic device 100 may output a query in a voice form to guide the user to utter a voice related to the voice form to the second electronic device 200a, 200b, 200c or 200d. For example, the first electronic device 100 may output, to the user, a prompt voice "Four devices were found. If you want to install all, say 'install all.'".

According to an embodiment, the second electronic device 200a, 200b, 200c or 200d may obtain a voice uttered by a user as the first voice signal 10. In this case, the second electronic device 200a, 200b, 200c or 200d may be in a state in which a microphone (e.g., the second microphone 210 of FIG. 2) is activated in response to a command of the first electronic device 100. In addition, the second electronic device 200a, 200b, 200c or 200d may transmit the first voice signal 10 to the first electronic device 100. For example, when a voice "Install all" is uttered by the user, the second electronic device 200a, 200b, 200c or 200d may obtain the voice as the first voice signal 10.

According to an embodiment, when it is identified that the first voice signal 10 received from the second electronic device 200a, 200b, 200c or 200d corresponds to the second voice signal (see operation 621 of FIG. 4A), the first electronic device 100 may register the second electronic device 200a, 200b, 200c or 200d arranged in one space in the specific area 20 in the intelligent server 300.

Figure 5:
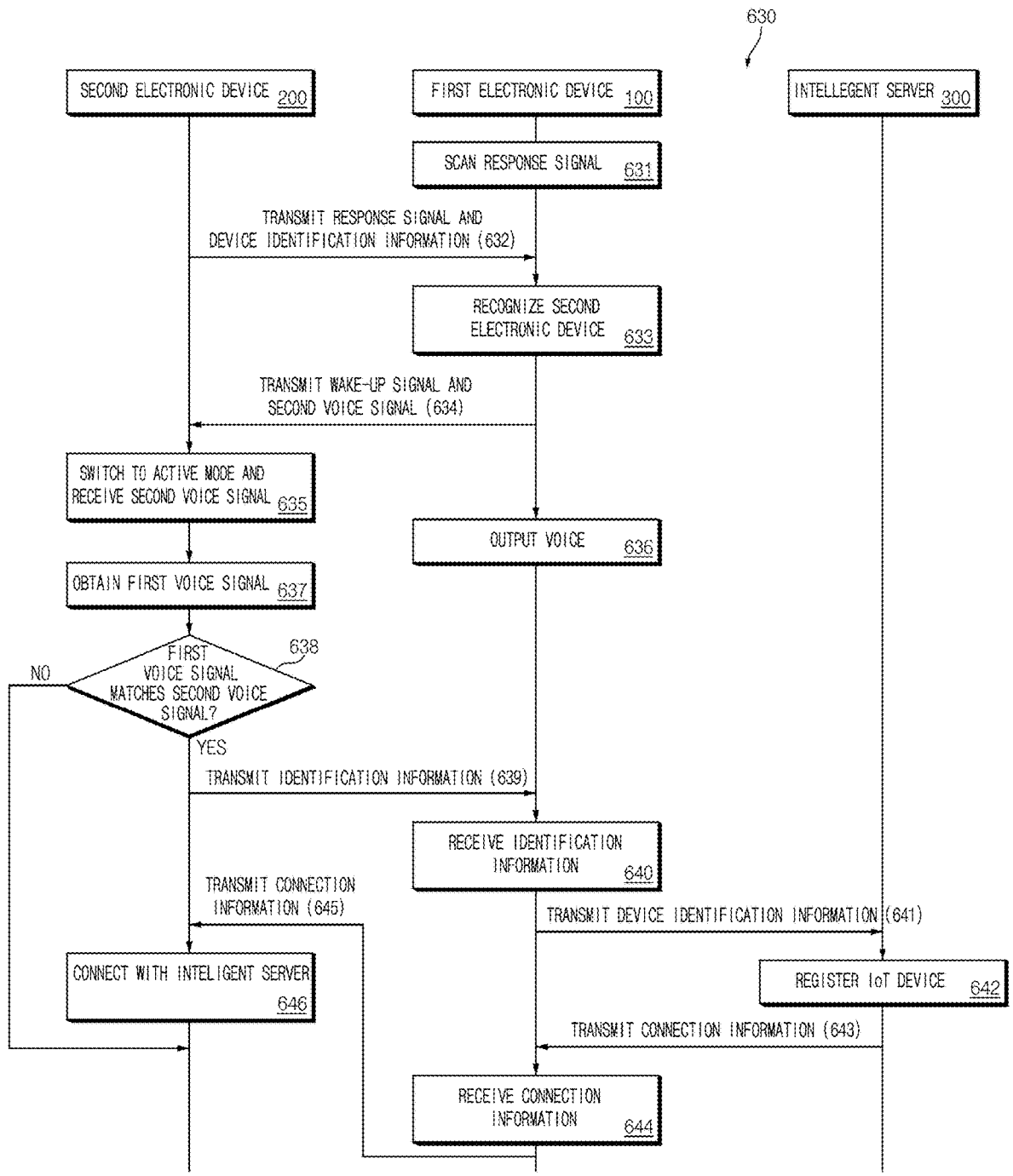
FIG. 5 illustrates a diagram of a process of registering an IoT device according to an embodiment.

FIG. 5 illustrates a diagram of a process of registering an IoT device according to an embodiment.

At least one of components of the IoT environment (e.g., the IoT environment 1000 of FIG. 2) shown in FIG. 5 is the same as or similar to at least one of the components of the first and second electronic devices 100 and 200 and the intelligent server 300 shown in FIG. 2, and thus, redundant descriptions will be omitted below.

Referring to FIG. 5, in registration process 630 of an IoT device according to an embodiment, the intelligent server 300 may register the second electronic device 200 based on a result of identifying a first voice signal (e.g., an input corresponding to a user's utterance) transmitted from the second electronic device 200 through the first electronic device 100.

Referring to operation 631, the first electronic device 100 according to an embodiment may scan a response signal of the second electronic device 200 in order to recognize the second electronic device 200 located adjacent to the first electronic device 100. For example, the first electronic device 100 may recognize the second electronic device 200 adjacent to the first electronic device 100 by scanning a response signal to a signal (e.g., a ping) transmitted from the first electronic device 100.

Referring to operation 632, the second electronic device 200 according to an embodiment may transmit at least one of the response signal and device identification information to the first electronic device 100. For example, the second electronic device 200 may transmit an acknowledgment (ACK) to the first electronic device 100 in response to a signal (e.g., a ping) transmitted from the first electronic device 100.

Referring to operation 633, the first electronic device 100 according to an embodiment may recognize the second electronic device 200 by receiving an acknowledgment to the response signal scanning from the second electronic device 200. For example, the first electronic device 100 may be connected to the second electronic device 200 through Bluetooth communication.

Referring to operation 634, the first electronic device 100 according to an embodiment may transmit a wake-up signal to the second electronic device 200 to activate a microphone (e.g., the second microphone 210 of FIG. 2) of the second electronic device 200 in response to the acknowledgment received from the second electronic device 200. In addition, in operation 634, the first electronic device 100 may transmit a second voice signal (e.g., a signal that is a reference for comparing with the first voice signal) to the second electronic device 200.

Referring to operation 635, in the second electronic device 200 according to an embodiment, the microphone 210 may be switched to an activation mode in response to a wake-up signal received from the first electronic device 100. Also, in operation 635, the second electronic device 200 may receive the second voice signal from the first electronic device 100.

Referring to operation 636, the first electronic device 100 according to an embodiment may output specified voice data. In this case, the first electronic device 100 may guide the user to utter a voice related to the voice form to the second electronic device 200 by outputting a voice query.

Referring to operation 637, the second electronic device 200 according to an embodiment may obtain the first voice signal from a user. In this case, the second electronic device 200 may obtain an input corresponding to a user's utterance as the first voice signal.

Referring to operation 638, the second electronic device 200 according to an embodiment may compare the obtained first voice signal with the second voice signal. For example, in operation 638, when the first voice signal corresponds to the second voice signal, the second electronic device 200 may execute operation 639. As another example, in operation 638, when the first voice signal does not correspond to the second voice signal, the second electronic device 200 may terminate the operation.

Referring to operation 639, the second electronic device 200 according to an embodiment may transmit another identification result of whether the first voice signal corresponds to the second voice signal, to the first electronic device 100.

Referring to operation 640, the first electronic device 100 according to an embodiment may receive an identification result of the first voice signal and the second voice signal from the second electronic device 200. In this case, the first electronic device 100 may further receive device identification information of the second electronic device 200 from the second electronic device 200.

Referring to operation 641, the first electronic device 100 according to an embodiment may transmit the device identification information of the second electronic device 200 to the intelligent server 300.

Referring to operation 642, the intelligent server 300 according to an embodiment may register the second electronic device 200 corresponding to the device identification information received from the first electronic device 100 as a new IoT device. In this case, the intelligent server 300 may store the device identification information of the second electronic device 200 received from the first electronic device 100 in the second memory 320.

Referring to operation 643, the intelligent server 300 according to an embodiment may transmit network connection information to the first electronic device 100.

Referring to operation 644, the first electronic device 100 according to an embodiment may receive the network connection information from the intelligent server 300.

Referring to operation 645, the first electronic device 100 according to an embodiment may transmit the network connection information to the second electronic device 200.

Referring to operation 646, the second electronic device 200 according to an embodiment may be connected to the intelligent server 300 by using the network connection information received from the first electronic device 100. In this case, the second electronic device 200 may be connected to the intelligent server 300 through an access point (e.g., a Wi-Fi router).

Figure 6A:
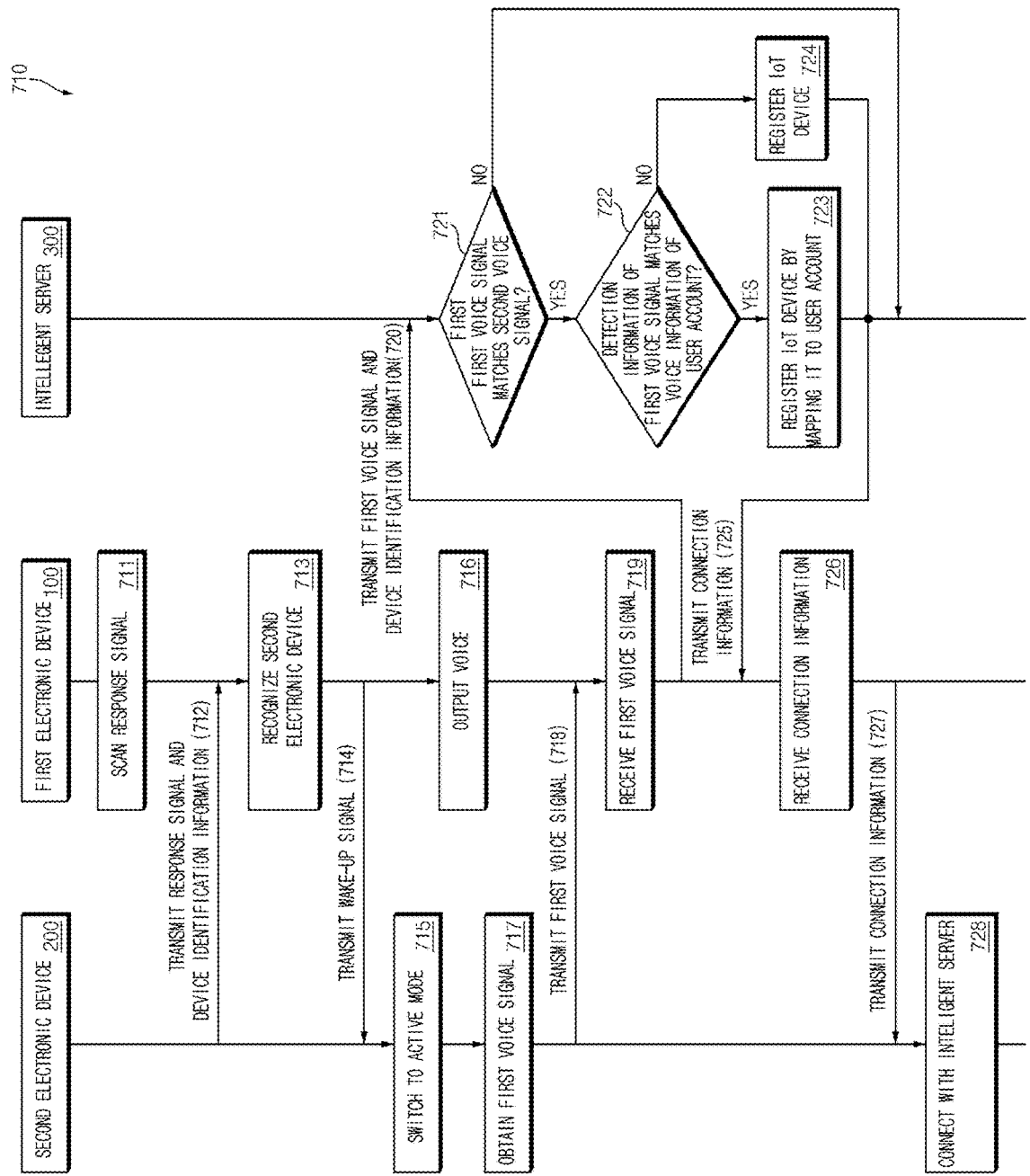
FIG. 6A illustrates a diagram of a process of registering an IoT device according to an embodiment.

FIG. 6A illustrates a diagram of a process of registering an IoT device according to an embodiment.

At least one of the components of an IoT environment (e.g., the IoT environment 1000 shown in FIG. 2) shown in FIG. 6A is the same as or similar to at least one of the components of the first and second electronic devices 100 and 200, and the intelligent server 300 shown in FIG. 2, and redundant descriptions will be omitted below.

Referring to FIG. 6A, in the registration process 710 of an IoT device according to an embodiment, the intelligent server 300 may register the second electronic device 200 in response to a first voice signal (e.g., an input corresponding to a user's utterance) transmitted from the second electronic device 200 through the first electronic device 100. As another example, in the registration process 710 of the second electronic device 200, the intelligent server 300 may register the second electronic device 200 in association with a user account based on feature information (e.g., a frequency on the basis of which a user's voice can be distinguished) detected in the first voice signal transmitted from the first electronic device 100.

Referring to operation 711, the first electronic device 100 according to an embodiment may scan a response signal of the second electronic device 200 in order to recognize the second electronic device 200 located adjacent to the first electronic device 100. For example, the first electronic device 100 may recognize the second electronic device 200 adjacent to the first electronic device 100 by scanning a response signal to a signal (e.g., a ping) transmitted from the first electronic device 100.

Referring to operation 712, the second electronic device 200 according to an embodiment may transmit at least one of the response signal and device identification information to the first electronic device 100. For example, the second electronic device 200 may transmit an acknowledgment (ACK) to the first electronic device 100 in response to a signal (e.g., a ping) transmitted from the first electronic device 100.

Referring to operation 713, the first electronic device 100 according to an embodiment may recognize the second electronic device 200 by receiving an acknowledgment to the response signal scanning from the second electronic device 200. For example, the first electronic device 100 may be connected to the second electronic device 200 through Bluetooth communication.

Referring to operation 714, the first electronic device 100 according to an embodiment may transmit a wake-up signal to the second electronic device 200 to activate a microphone (e.g., the second microphone 210 of FIG. 2) of the second electronic device 200 in response to the acknowledgment received from the second electronic device 200.

Referring to operation 715, in the second electronic device 200 according to an embodiment, the microphone 210 may be switched to an activation mode in response to a wake-up signal received from the first electronic device 100.

Referring to operation 716, the first electronic device 100 according to an embodiment may output specified voice data. In this case, the first electronic device 100 may guide the user to utter a voice related to the voice form to the second electronic device 200 by outputting a voice query.

Referring to operation 717, the second electronic device 200 according to an embodiment may obtain a first voice signal from a user. In this case, the second electronic device 200 may obtain an input corresponding to a user's utterance as the first voice signal.

Referring to operation 718, the second electronic device 200 according to an embodiment may transmit the obtained first voice signal to the first electronic device 100. In this case, the second electronic device 200 may further transmit device identification information of the second electronic device 200 to the first electronic device 100.

Referring to operation 719, the first electronic device 100 according to an embodiment may receive the first voice signal from the second electronic device 200. In this case, the first electronic device 100 may further receive the device identification information of the second electronic device 200 from the second electronic device 200.

Referring to operation 720, the first electronic device 100 according to an embodiment may transmit the first voice signal and device identification information to the intelligent server 300.

Referring to operation 721, the intelligent server 300 according to an embodiment may determine whether the first voice signal received from the first electronic device 100 corresponds to the second voice signal stored in a memory (e.g., the second memory 320 of FIG. 2). For example, in operation 721, when the first voice signal corresponds to the second voice signal, the intelligent server 300 may execute operation 722. As another example, in operation 721, when the first voice signal does not correspond to the second voice signal, the intelligent server 300 may terminate the operation.

Referring to operation 722, the intelligent server 300 according to an embodiment may determine whether feature information (e.g., a frequency on the basis of which a user's voice can be distinguished) detected in the first voice signal corresponds to the voice information of a user. For example, in operation 722, when the feature information of the first voice signal corresponds to the voice information of a user account, the intelligent server 300 may execute operation 723. As another example, in operation 722, when the feature information of the first voice signal does not correspond to the voice information of the user account, the intelligent server 300 may execute operation 724.

Referring to operation 724, the intelligent server 300 according to an embodiment may register the second electronic device 200 that has transmitted the first voice signal to the first electronic device 100 as a new IoT device. In this case, the intelligent server 300 may register the feature information of the first voice signal that does not correspond to the voice information of the user account as voice information of a new user account. In addition, in operation 724, the intelligent server 300 may transmit network connection information to the second electronic device 200 through the first electronic device 100 based on the registration of the second electronic device 200.

Referring to operation 725, the intelligent server 300 according to an embodiment may register the second electronic device 200 that has transmitted the first voice signal in association with the user account as a new IoT device. In this case, the intelligent server 300 may assign, to the second electronic device 200, authority (e.g., authority to control an IoT device) to access to the user account related to the second electronic device 200.

Referring to operation 725, the intelligent server 300 according to an embodiment may transmit network connection information to the first electronic device 100.

Referring to operation 726, the first electronic device 100 according to an embodiment may receive the network connection information from the intelligent server 300.

Referring to operation 727, the first electronic device 100 according to an embodiment may transmit the network connection information to the second electronic device 200.

Referring to operation 728, the second electronic device 200 according to an embodiment may be connected to the intelligent server 300 by using the network connection information received from the first electronic device 100. In this case, the second electronic device 200 may be connected to the intelligent server 300 through an access point (e.g., a Wi-Fi router).

Figure 6B:
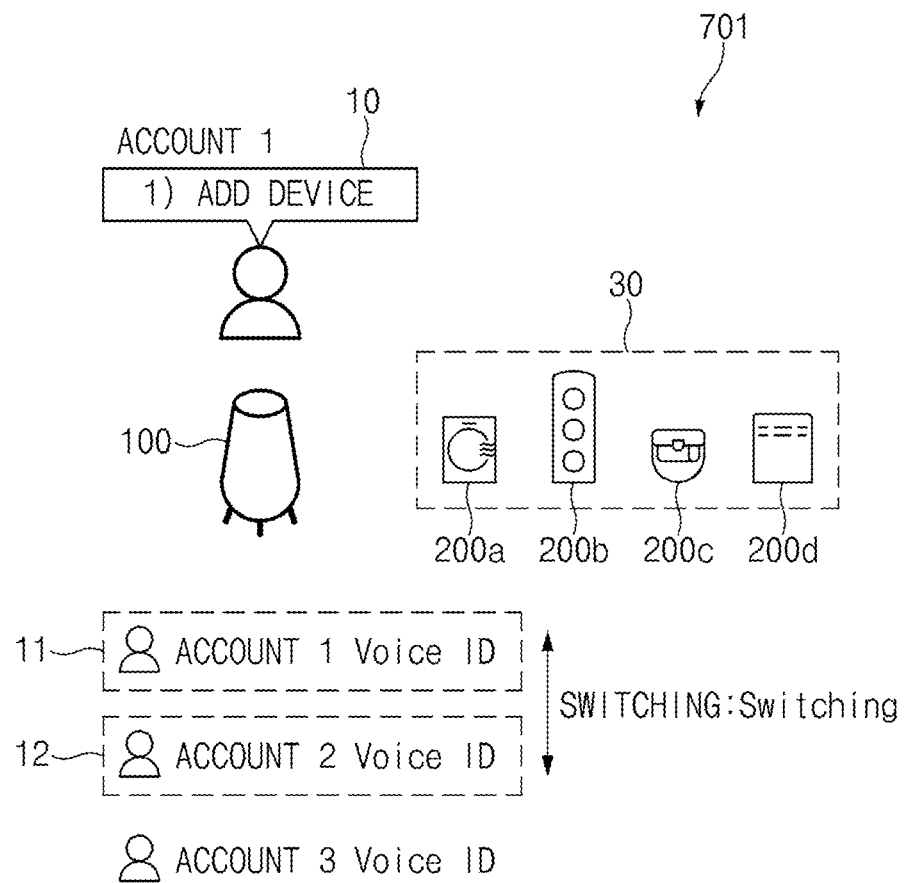
FIG. 6B illustrates a diagram of a registration environment of an IoT device according to an embodiment

FIG. 6B illustrates a diagram of a registration environment of an IoT device according to an embodiment.

Referring to FIG. 6B, in a registration environment 701 of an IoT device according to an embodiment, the first electronic device 100 may receive a user's voice, and register the second electronic device 200a, 200b, 200c or 200d in an intelligent server (e.g., the intelligent server 300 of FIGS. 1 to 3) corresponding to a user account corresponding to the user voice.

According to an embodiment, the second electronic device 200a, 200b, 200c or 200d may obtain a voice uttered by a user as the first voice signal 10. In this case, the second electronic device 200a, 200b, 200c or 200d may be in a state in which a microphone (e.g., the second microphone 210 of FIG. 2) is activated in response to a command of the first electronic device 100. In addition, the second electronic device 200a, 200b, 200c or 200d may transmit the first voice signal 10 to the first electronic device 100. For example, when a voice "Add a device" is uttered by the user, the second electronic device 200a, 200b, 200c, or 200d may obtain the voice as the first voice signal 10

According to an embodiment, when the first voice signal 10 received from the second electronic device 200a, 200b, 200c or 200d corresponds to the second voice signal, and it is identified that the feature information of the first voice signal 10 corresponds to the voice information of the specified user account (see operations 721 and 722 of FIG. 6A), the first electronic device 100 may register the second electronic device 200a, 200b, 200c or 200d arranged in one space within a specific area 30 in the intelligent server 300 in association with the user account. For example, when the first voice signal 10 received from the second electronic device 200a, 200b, 200c or 200d corresponds to the voice information of a first user account 11, the first electronic device 100 may switch the user account from a second user account 12 to the first user account 11, thereby identifying authority to access to the second electronic device 200a, 200b, 200c or 200d. In this case, the first electronic device 100 may execute a control command based on the access authority of the first user account 11 to the second electronic device 200a, 200b, 200c or 200d.

Figure 7A:
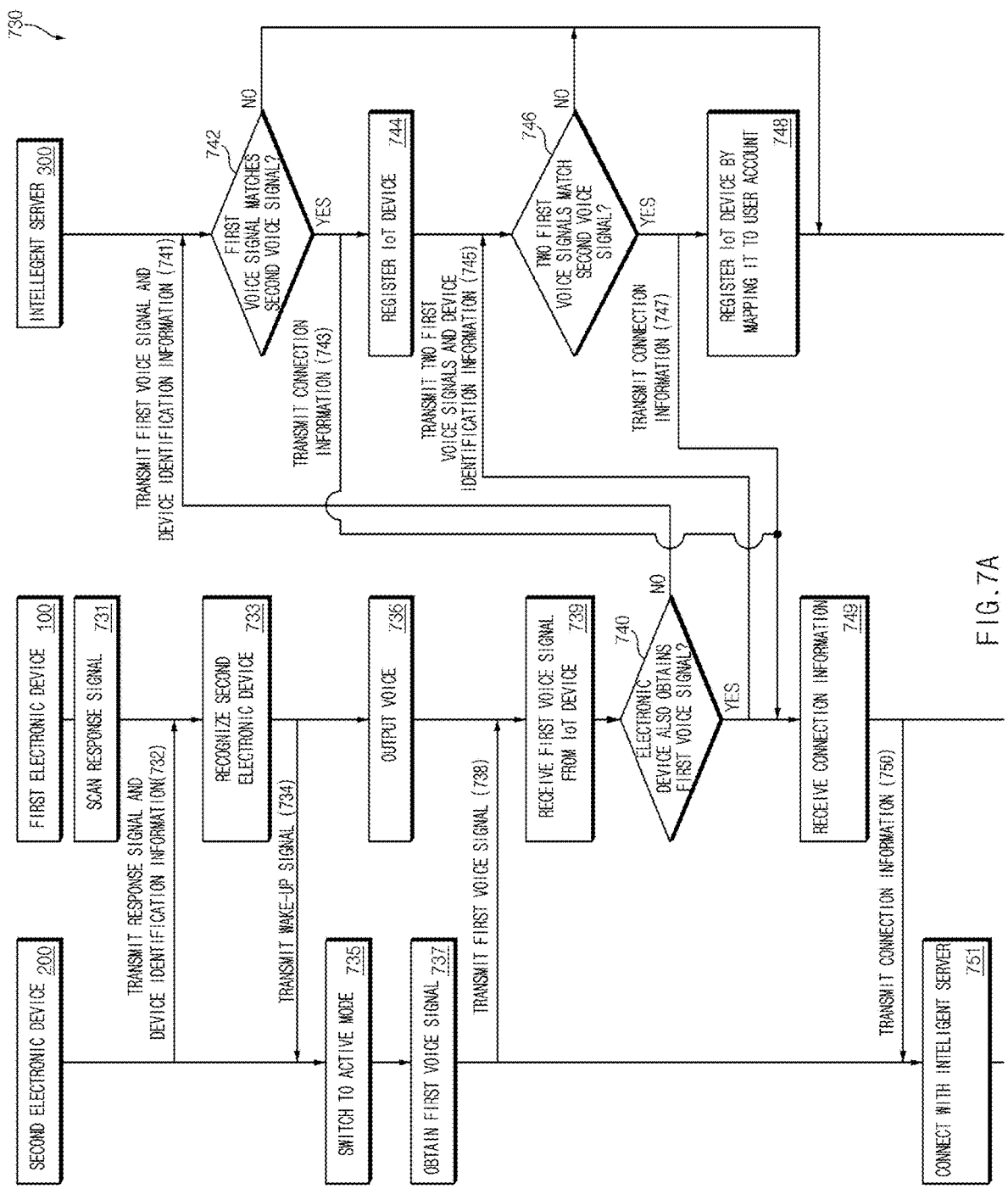
FIG. 7A illustrates a diagram of a process of registering an IoT device according to an embodiment.

FIG. 7A illustrates a diagram of a process of registering an IoT device according to an embodiment.

At least one of the components of an IoT environment (e.g., the IoT environment 1000 shown in FIG. 2) shown in FIG. 7A is the same as or similar to at least one of the components of the first and second electronic devices 100 and 200, and the intelligent server 300 shown in FIG. 2, and redundant descriptions will be omitted below.

Referring to FIG. 7A, in the registration process 730 of an IoT device according to an embodiment, the intelligent server 300 may register the second electronic device 200 in response to a first voice signal (e.g., an input corresponding to a user's utterance) transmitted from the second electronic device 200 through the first electronic device 100. As another example, in the registration process 730 of the IoT device, the intelligent server 300 may register the second electronic device 200 in association with the first electronic device 100 based on whether a first voice signal obtained by the second electronic device 200 corresponds to a first voice signal obtained by the first electronic device 100.

Referring to operation 731, the first electronic device 100 according to an embodiment may scan a response signal of the second electronic device 200 in order to recognize the second electronic device 200 located adjacent to the first electronic device 100. For example, the first electronic device 100 detects the second electronic device 200 adjacent to the first electronic device 100 by scanning a response signal for a signal (e.g., ping) transmitted from the first electronic device 100. I can recognize it.

Referring to operation 732, the first electronic device 100 may recognize the second electronic device 200 adjacent to the first electronic device 100 by scanning a response signal to a signal (e.g., a ping) transmitted from the first electronic device 100. For example, the second electronic device 200 may transmit an acknowledgment (ACK) to the first electronic device 100 in response to a signal (e.g., a ping) transmitted from the first electronic device 100.

Referring to operation 733, the first electronic device 100 according to an embodiment may recognize the second electronic device 200 by receiving an acknowledgment to the response signal scanning from the second electronic device 200. For example, the first electronic device 100 may be connected to the second electronic device 200 through Bluetooth communication.

Referring to operation 734, the first electronic device 100 according to an embodiment may transmit a wake-up signal to the second electronic device 200 to activate a microphone (e.g., the second microphone 210 of FIG. 2) of the second electronic device 200 in response to the acknowledgment received from the second electronic device 200.

Referring to operation 735, in the second electronic device 200 according to an embodiment, the microphone 210 may be switched to an activation mode in response to a wake-up signal received from the first electronic device 100.

Referring to operation 736, the first electronic device 100 according to an embodiment may output specified voice data. In this case, the first electronic device 100 may guide the user to utter a voice related to the voice form to the second electronic device 200 by outputting a voice query.

Referring to operation 737, the second electronic device 200 according to an embodiment may obtain a first voice signal from a user. In this case, the second electronic device 200 may obtain an input according to a user's utterance as the first voice signal.

Referring to operation 738, the second electronic device 200 according to an embodiment may transmit the obtained first voice signal to the first electronic device 100. In this case, the second electronic device 200 may further transmit device identification information of the second electronic device 200 to the first electronic device 100.

Referring to operation 739, the first electronic device 100 according to an embodiment may receive the first voice signal from the second electronic device 200. In this case, the first electronic device 100 may further receive the device identification information of the second electronic device 200 from the second electronic device 200.

Referring to operation 740, the first electronic device 100 according to an embodiment may determine whether the first voice signal is also obtained through a microphone (e.g., the first microphone 150 of FIG. 2) of the first electronic device 100. For example, in operation 740, when the first voice signal is received only by the electronic device 200, the first electronic device 100 may execute operation 745. As another example, in operation 740, when the first voice signal is received by both the first and second electronic devices 100 and 200, the first electronic device 100 may execute operation 741.

Referring to operation 741, the first electronic device 100 according to an embodiment may transmit one first voice signal obtained by the second electronic device 200 and device identification information to the intelligent server 300.

Referring to operation 742, the intelligent server 300 according to an embodiment may determine whether the one first voice signal obtained by the second electronic device 200 corresponds to a second voice signal stored in a memory (e.g., the second memory 320 of FIG. 2). For example, in operation 742, the intelligent server 300 may execute operation 743 when the first voice signal corresponds to the second voice signal. As another example, in operation 742, when the first voice signal does not correspond to the second voice signal, the intelligent server 300 may terminate the operation.

Referring to operation 743, the intelligent server 300 according to an embodiment may transmit network connection information to the first electronic device 100.

Referring to operation 744, the intelligent server 300 according to an embodiment may register the second electronic device 200 that has transmitted the first voice signal to the first electronic device 100 as a new IoT device. In this case, the intelligent server 300 may store the device identification information of the second electronic device 200 received from the first electronic device 100 in the second memory 320.

Referring to operation 745, the first electronic device 100 according to an embodiment may transmit, to the intelligent server 300, the first voice signal obtained from the second electronic device 200 and the first voice signal and device identification information obtained by the first electronic device 100.

Referring to operation 746, the intelligent server 300 according to an embodiment may determine whether the first voice signal obtained from the second electronic device 200, the first voice signal obtained from the first electronic device 100, and the second voice signal stored in the memory (e.g., the second memory 320 of FIG. 2) correspond to each other. For example, in operation 746, when the two first voice signals (e.g., the first voice signal obtained from the second electronic device 200 and the first voice signal obtained from the first electronic device 100) correspond to the second voice signal, the intelligent server 300 may execute operation 747. As another example, in operation 746, when the two first voice signals do not correspond to the second voice signal, the intelligent server 300 may terminate the operation.

Referring to operation 747, the intelligent server 300 according to an embodiment may transmit the network connection information to the first electronic device 100.

Referring to operation 748, the intelligent server 300 according to an embodiment may register the second electronic device 200, which has obtained the first voice signal, in association with the first electronic device 100. In this case, the intelligent server 300 may specify a place of the second electronic device 200 that exists in a space adjacent to (or the same as) the first electronic device 100 with respect to the second electronic device 200 related to the first electronic device 100.

Referring to operation 749, the first electronic device 100 according to an embodiment may receive the network connection information from the intelligent server 300.

Referring to operation 750, the first electronic device 100 according to an embodiment may transmit the network connection information to the second electronic device 200.

Referring to operation 751, the second electronic device 200 according to an embodiment may be connected to the intelligent server 300 by using the network connection information received from the first electronic device 100. In this case, the second electronic device 200 may be connected to the intelligent server 300 through an access point (e.g., a Wi-Fi router).

Figure 7B:
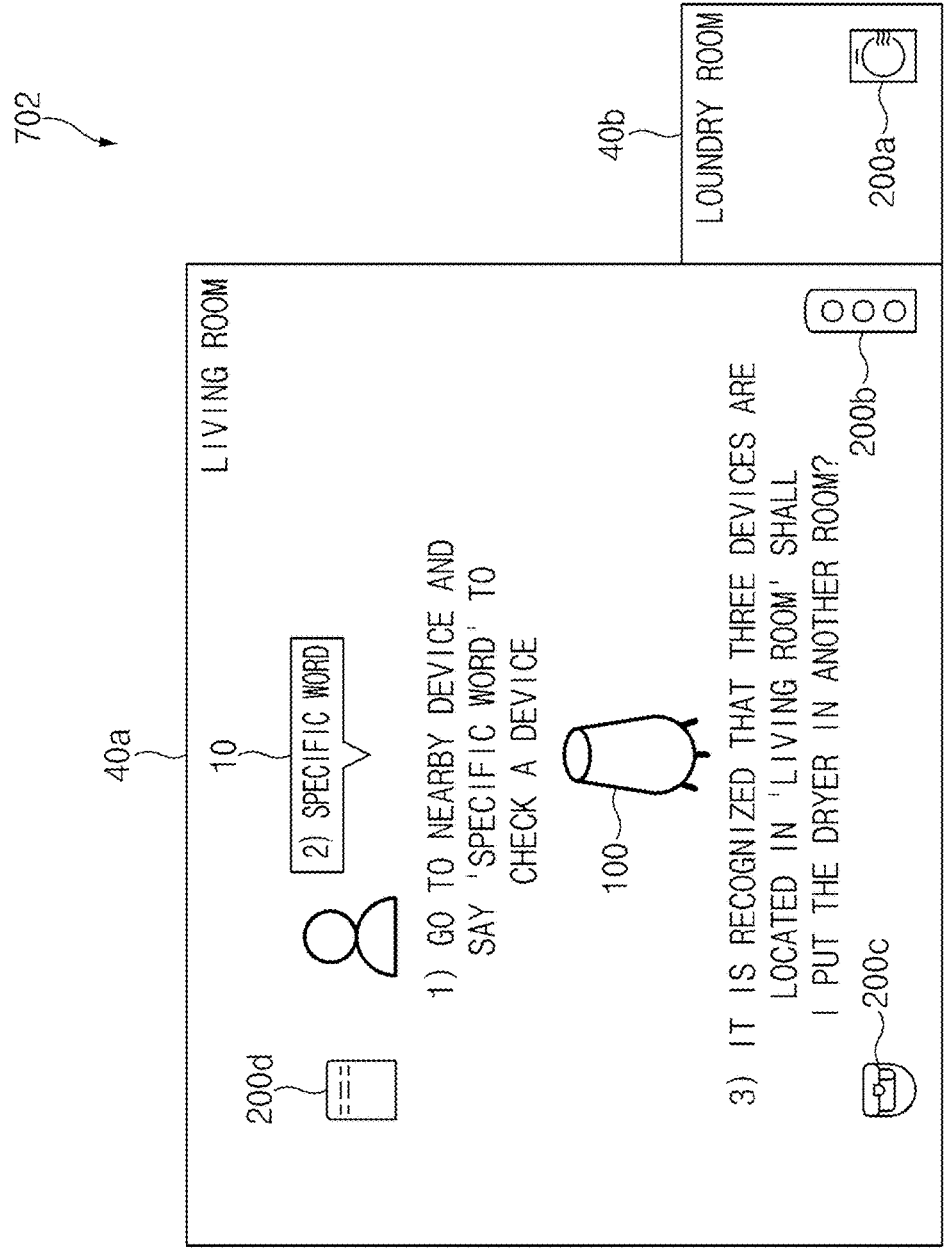
FIG. 7B illustrates a diagram of a registration environment of an IoT device according to an embodiment.

FIG. 7B illustrates a diagram of a registration environment of an IoT device according to an embodiment.

Referring to FIG. 7B, in a registration environment 702 of an IoT device according to an embodiment, the first electronic device 100 may guide a user to utter a voice to the second electronic device 200, and in response to the voice, cause the second electronic device 200a, 200b, 200c, or 200d to be registered in an intelligent server (e.g., the intelligent server 300 of FIGS. 1 to 3). In addition, in the registration environment 702 of the IoT device according to an embodiment, the first electronic device 100 may specify a place of the second electronic device 200a, 200b, 200c or 200d that exists in a space adjacent to (or the same as) the first electronic device 100 when a user voice obtained from the second electronic device 200a, 200b, 200c or 200d is also recognized by the first electronic device 100.

According to an embodiment, the first electronic device 100 may output a query in a voice form to guide the user to utter a voice related to the voice form to the second electronic device 200a, 200b, 200c or 200d. For example, the first electronic device 100 may output a prompt voice "Go to a nearby device and say 'a specific word' to check the device." to the user.

According to an embodiment, the second electronic device 200a, 200b, 200c or 200d may obtain a voice uttered by a user as the first voice signal 10. In this case, the second electronic device 200a, 200b, 200c or 200d may be in a state in which the microphone (e.g., the second microphone 210 of FIG. 2) is activated according to a command of the first electronic device 100. In addition, the second electronic device 200a, 200b, 200c or 200d may transmit the first voice signal 10 to the first electronic device 100. For example, when a voice "specific word" is uttered by the user, the second electronic device 200b, 200c or 200d may obtain the voice as the first voice signal 10.

According to an embodiment, when the first voice signal 10 received from the second electronic device 200b, 200c or 200d is also obtained through the microphone (e.g., the first microphone 150 of FIG. 2) of the first electronic device 100, the first electronic device 100 may determine whether the two first voice signals 10 correspond to the second voice signal (see operation 746 of FIG. 7A). When it is identified that the two first voice signals 10 correspond to the second voice signal, the first electronic device 100 may register the second electronic device 200b, 200c or 200d arranged in one space within a first specific area 40a in the intelligent server 300. For example, the first electronic device 100 may output a prompt voice "It is recognized that three devices are located in the 'living room'. Shall I put the dryer (e.g., 200a) in another room (e.g. 40b)?" to the user.

Figure 7C:
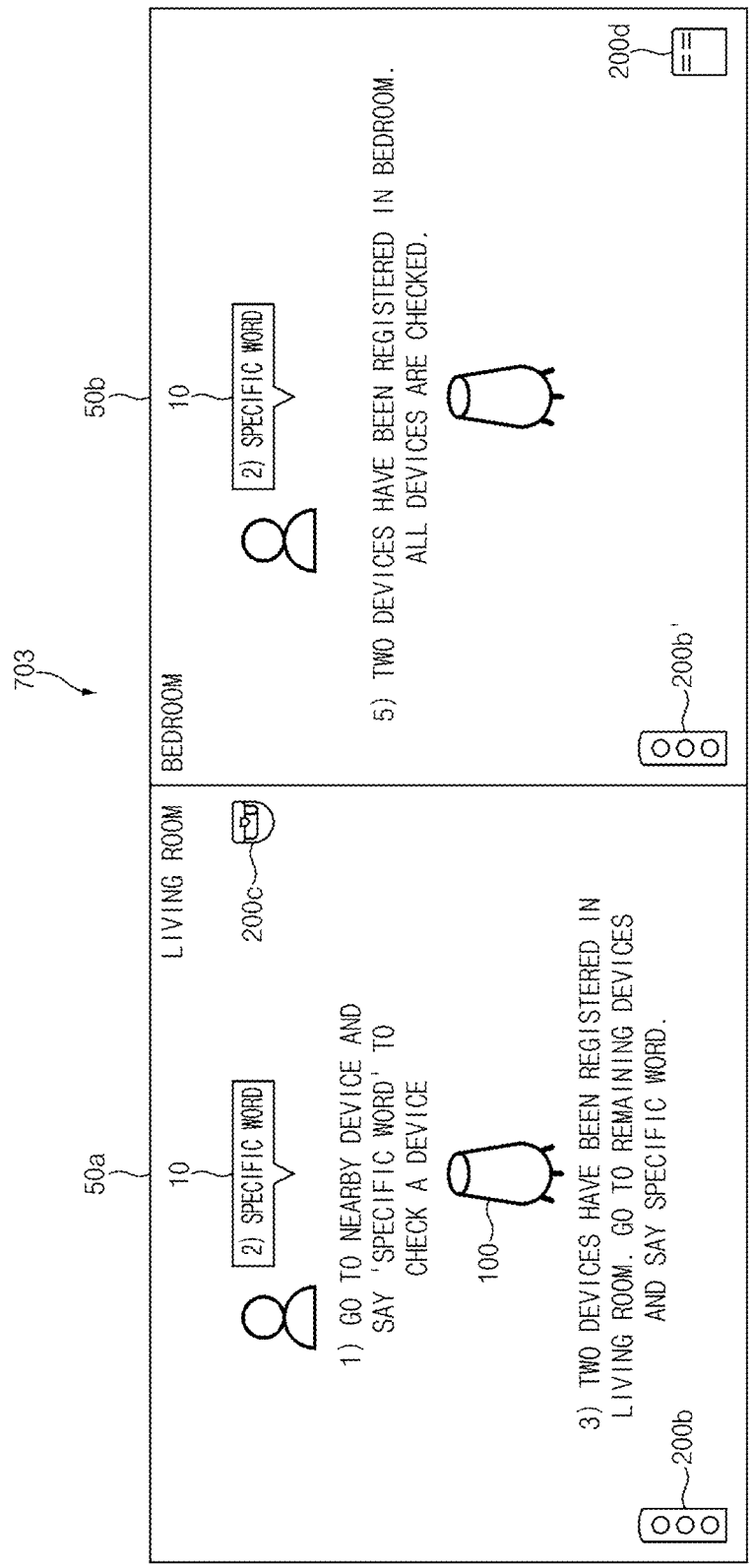
FIG. 7C illustrates a diagram of a registration environment of an IoT device according to an embodiment.

FIG. 7C illustrates a diagram of a registration environment of an IoT device according to an embodiment.

Referring to FIG. 7C, in a registration environment 703 of the IoT device according to an embodiment, the first electronic device 100 may guide a user to utter a voice to the second electronic device 200, and in response to the voice, cause a second electronic device 200b, 200b', 200c, or 200d to be registered in an intelligent server (e.g., the intelligent server 300 of FIGS. 1 to 3). In addition, in the registration environment 703 of the IoT device according to an embodiment, the first electronic device 100 may specify a place of the second electronic device 200b, 200b', 200c, or 200d that exists in a space adjacent to (or the same as) the first electronic device 100 when a user voice obtained from the second electronic device 200b, 200b', 200c, or 200d is also recognized by the first electronic device 100. In this case, the first electronic device 100 may request the second electronic device 200b, 200b', 200c or 200d arranged in a different area to be registered in another first electronic device 100'.

According to an embodiment, the first electronic device 100 may output a query in a voice form to allow the user to utter a voice related to the voice form to the second electronic device 200a, 200b, 200c or 200d. For example, the first electronic device 100 may output a prompt voice "Go to a nearby device and say 'a specific word' to check the device." to the user.

According to an embodiment, the second electronic device 200b, 200b', 200c or 200d may obtain a voice uttered by the user as the first voice signal 10. In this case, the second electronic device 200b, 200b', 200c or 200d may be in a state in which the microphone (e.g., the second microphone 210 of FIG. 2) is activated in response to a command of the first electronic device 100. In addition, the second electronic device 200b, 200b', 200c or 200d may transmit the first voice signal 10 to the first electronic device 100. For example, when a voice "a specific word" is uttered by the user, the second electronic device 200b or 200c may obtain the voice as the first voice signal 10.

According to an embodiment, when the first voice signal 10 received from the second electronic device 200b or 200c is also obtained through the microphone (e.g., the first microphone 150 of FIG. 2) of the first electronic device 100, the first electronic device 100 may determine whether the two first voice signals 10 correspond to the second voice signal (see operation 746 of FIG. 7A). When it is determined that the two first voice signals 10 correspond to the second voice signal, the first electronic device 100 may register the second electronic device 200b or 200c arranged in one space within a first specific area 50a in the intelligent server 300. For example, the first electronic device 100 may output a prompt voice "Two devices have been registered in the living room. Go to the remaining device and say a specific word." to the user.

According to an embodiment, the second electronic device 200b' or 200d may obtain a voice uttered by a user as the first voice signal 10. In addition, the second electronic device 200b' or 200d may transmit the first voice signal 10 to another first electronic device 100'. For example, when a voice "specific word" is spoken by the user, the second electronic device 200b' or 200d may obtain the voice as the first voice signal 10.

According to an embodiment, when the first voice signal 10 received from the second electronic device 200b' or 200d is also obtained through a microphone (e.g., the first microphone 150 of FIG. 2) of another first electronic device 100', the another first electronic device 100' may determine whether the two first voice signals 10 correspond to the second voice signal (see operation 746 in FIG. 7A). When it is determined that the two first voice signals 10 correspond to the second voice signal, the first electronic device 100 may register the second electronic device 200b' or 200d arranged in one space in a second specific area 50b in the intelligent server 300. For example, the first electronic device 100 may output a prompt voice "Two devices have been registered in the bedroom. All devices are checked." to the user.

Figure 8A:
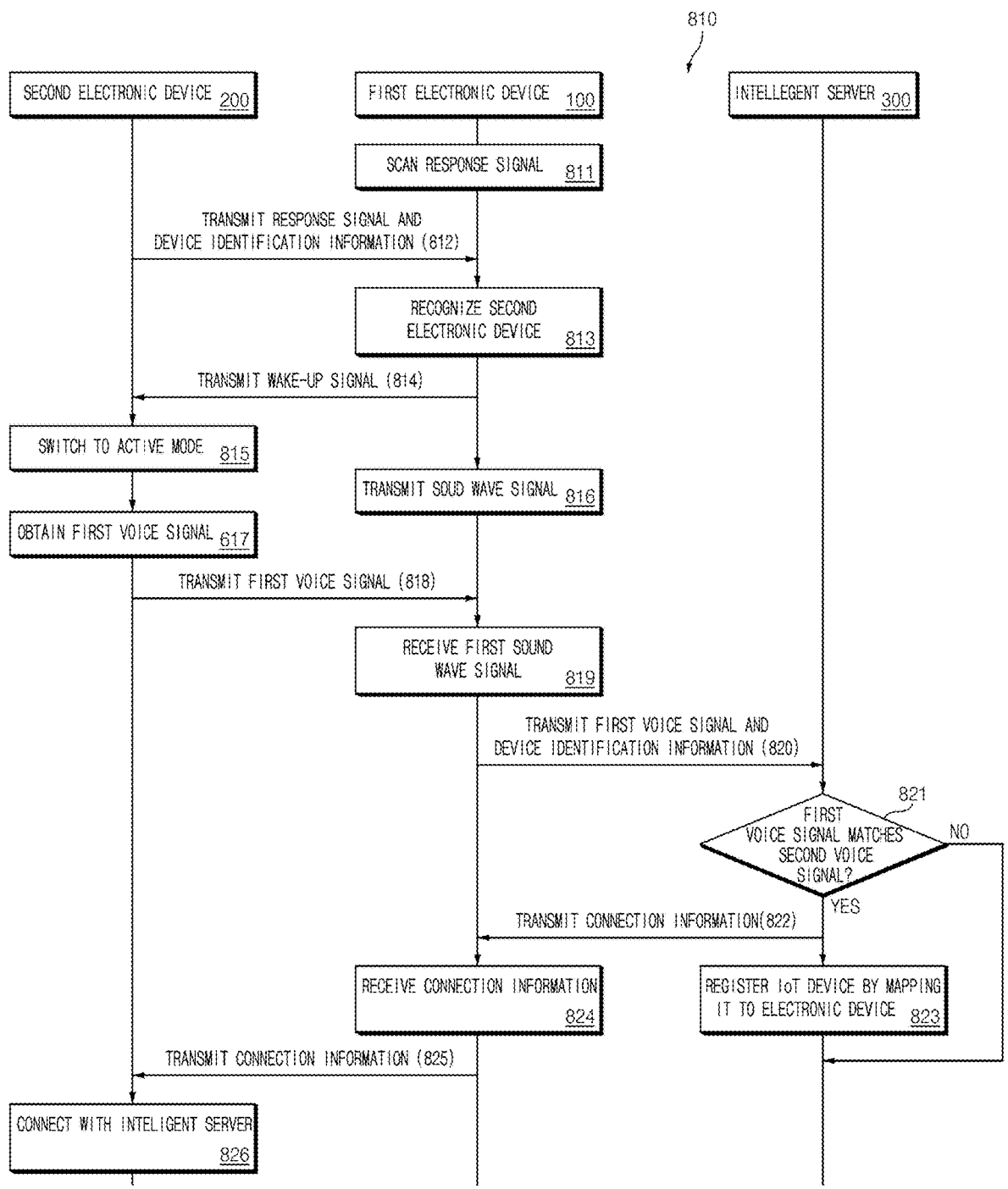
FIG. 8A illustrates a diagram of a process of registering an IoT device according to an embodiment.

FIG. 8A illustrates a diagram of a process of registering an IoT device according to an embodiment.

At least one of the components of an IoT environment (e.g., the IoT environment 1000 shown in FIG. 2) shown in FIG. 8A is the same as or similar to at least one of the components of the first and second electronic devices 100 and 200, and the intelligent server 300 shown in FIG. 2, and redundant descriptions will be omitted below.

Referring to FIG. 8A, in a registration process 810 of an IoT device according to an embodiment, the intelligent server 300 may register the second electronic device 200 in response to a first sound wave signal (e.g., an input corresponding to a ultrasonic wave transmitted from the first electronic device 100) transmitted through the first electronic device 100 from the second electronic device 200.

Referring to operation 811, the first electronic device 100 according to an embodiment may scan a response signal of the second electronic device 200 in order to recognize the second electronic device 200 located adjacent to the first electronic device 100. For example, the first electronic device 100 may recognize the second electronic device 200 adjacent to the first electronic device 100 by scanning a response signal to a signal (e.g., a ping) transmitted from the first electronic device 100.

Referring to operation 812, the second electronic device 200 according to an embodiment may transmit at least one of the response signal and device identification information to the first electronic device 100. For example, the second electronic device 200 may transmit an acknowledgment (ACK) to the first electronic device 100 in response to a signal (e.g., a ping) transmitted from the first electronic device 100.

Referring to operation 813, the first electronic device 100 according to an embodiment may recognize the second electronic device 200 by receiving an acknowledgment to the response signal scanning from the second electronic device 200. For example, the first electronic device 100 may be connected to the second electronic device 200 through Bluetooth communication.

Referring to operation 814, the first electronic device 100 according to an embodiment may transmit a wake-up signal to the second electronic device 200 to activate a microphone (e.g., the second microphone 210 of FIG. 2) of the second electronic device 200 in response to the acknowledgment received from the second electronic device 200.

Referring to operation 815, in the second electronic device 200 according to an embodiment, the microphone 210 may be switched to an activation mode in response to a wake-up signal received from the first electronic device 100.

Referring to operation 816, the first electronic device 100 according to an embodiment may transmit a second sound wave signal (e.g., an ultrasonic wave transmitted from the first electronic device 100). In this case, the first electronic device 100 may transmit an ultrasonic wave in a frequency band that the user cannot hear.

Referring to operation 817, the second electronic device 200 according to an embodiment may obtain a first sound wave signal. In this case, the second electronic device 200 may obtain an input corresponding to an ultrasonic wave transmitted from the first electronic device 100 as the first sound wave signal.

Referring to operation 818, the second electronic device 200 according to an embodiment may transmit the obtained first sound wave signal to the first electronic device 100. In this case, the second electronic device 200 may further transmit device identification information of the second electronic device 200 to the first electronic device 100.

Referring to operation 819, the first electronic device 100 according to an embodiment may receive the first sound wave signal from the second electronic device 200. In this case, the first electronic device 100 may further receive the device identification information of the second electronic device 200 from the second electronic device 200.

Referring to operation 820, the first electronic device 100 according to an embodiment may transmit the first sound wave signal and the device identification information to the intelligent server 300.

Referring to operation 821, the intelligent server 300 according to an embodiment may determine whether the first sound wave signal received from the first electronic device 100 corresponds to a second sound wave signal stored in a memory (e.g., the second memory 320 of FIG. 2). For example, in operation 821, when the first sound wave signal corresponds to the second sound wave signal, the intelligent server 300 may execute operations 822 and 823. As another example, in operation 821, when the first sound wave signal does not correspond to the second sound wave signal, the intelligent server 300 may terminate the operation.

Referring to operation 822, the intelligent server 300 according to an embodiment may transmit network connection information to the first electronic device 100.

Referring to operation 823, the intelligent server 300 according to an embodiment may register the second electronic device 200 that has transmitted the first sound wave signal to the first electronic device 100 as a new IoT device. In this case, the intelligent server 300 may store the device identification information of the second electronic device 200 received from the first electronic device 100 in the second memory 320.

Referring to operation 824, the first electronic device 100 according to an embodiment may receive the network connection information from the intelligent server 300.

Referring to operation 825, the first electronic device 100 according to an embodiment may transmit the network connection information to the second electronic device 200.

Referring to operation 826, the second electronic device 200 according to an embodiment may be connected to the intelligent server 300 by using the network connection information received from the first electronic device 100. In this case, the second electronic device 200 may be connected to the intelligent server 300 through an access point (e.g., a Wi-Fi router).

FIG. 8B illustrates a diagram of a registration environment of an IoT device according to an embodiment.

Referring to FIG. 8B, in a registration environment 801 of an IoT device according to an embodiment, the first electronic device 100 guides a user to utter a voice to the second electronic device 200 to allow the second electronic device 200a, 200b, 200c or 200d to be registered in an intelligent server (e.g., the intelligent server 300 of FIGS. 1 to 3).

According to an embodiment, the first electronic device 100 may transmit a second sound wave signal in an ultrasonic wave form. For example, the first electronic device 100 may output a prompt voice "Please wait for a while to check the device." to the user.

According to an embodiment, the second electronic device 200a, 200b, 200c or 200d may obtain the ultrasonic wave transmitted from the first electronic device 100 as a first sound wave signal. In this case, the second electronic device 200a, 200b, 200c or 200d may be in a state in which a microphone (e.g., the second microphone 210 of FIG. 2) is activated in response to a command of the first electronic device 100. In addition, the second electronic device 200a, 200b, 200c or 200d may transmit a first sound wave signal to the first electronic device 100. For example, when an ultrasonic wave is transmitted from the first electronic device 100, the second electronic device 200b, 200c, or 200d arranged in one space within a first specific area 60a may obtain the ultrasonic wave as the first sound wave signal.

According to an embodiment, when it is determined that the first sound wave signal received from the second electronic device 200a, 200b, 200c or 200d corresponds to the second sound wave signal (see operation 821 of FIG. 8A), the first electronic device 100 may register the second electronic device 200a, 200b, 200c or 200d arranged in one space in the first specific area 60a in the intelligent server 300. For example, when it is determined that the first sound wave signal received from the second electronic device 200b, 200c or 200d in a living room corresponds to the second sound wave signal, the first electronic device 100 may output a prompt voice "Three devices have been automatically registered in the 'living room'." to the user. In this case, because the second electronic device 200a (e.g., a dryer) arranged in one space in a second specific area 60b (e.g., a laundry room) does not receive the first sound wave signal, the second electronic device 200a may not be registered through the first electronic device 100.

According to the various embodiments described above, a server for supporting a communication environment between different electronic devices includes a communication circuit, a memory, and a processor electrically connected to the communication circuit and the memory, wherein the processor may be configured to receive a first voice signal transmitted from a second electronic device to a first electronic device through the communication circuit, and allow the first electronic device to transmit network connection information for connecting with the server to the second electronic device based on whether the first voice signal corresponds to a second voice signal stored in the memory.

According to the various embodiments described above, the processor may be configured to allow the first electronic device to transmit the network connection information to the second electronic device when the processor determines that the first voice signal from the first electronic device corresponds to the second electronic device.

According to the various embodiments described above, the processor may be configured to associate identification information of the second electronic device with a user account when the first voice signal corresponds to the second voice signal and feature information of the first voice signal corresponds to voice information of the user account stored in the memory.

According to the various embodiments described above, the processor may be configured to assign access authority to the second electronic device to the user account related to the identification information of the second electronic device.

According to the various embodiments described above, the processor may be configured to associate identification information of the second electronic device with identification information of the first electronic device based on whether the first voice signal obtained from each of the first and second electronic devices corresponds to the second voice signal stored in the memory.

According to the various embodiments described above, the processor may be configured to register the second electronic device in a specified place when the identification information of the second electronic device is associated with the identification information of the first electronic device.

According to the various embodiments described above, the processor may be configured to register the second electronic device in another specified place other than the specified place when the first voice signal is transmitted to the second electronic device with a signal value equal to or less than a specified size.

According to the various embodiments described above, the processor may be configured to associate the identification information of the second electronic device with identification information of another first electronic device when the first voice signal is received by the another first electronic device located in the another specified place.

According to the various embodiments described above, an electronic device for supporting a communication environment between different electronic devices includes a communication circuit, and a processor electrically connected to the communication circuit, wherein the processor may be configured to transmit a first voice signal received from a second electronic device to a server through the communication circuit, and receive network connection information for connection with the server from the server and transmit the network connection information to the second electronic device based on whether the first voice signal corresponds to a second voice signal stored in a memory of the server.

According to the various embodiments described above, the processor may be configured to transmit a wake-up signal for switching a microphone included in the second electronic device to an activation mode to the second electronic device when an acknowledgment (ACK) for a transmission signal of the electronic device is received from the second electronic device through the communication circuit.

According to the various embodiments described above, the electronic device may further include a speaker, wherein the processor may be configured to output voice data related to the first voice signal through the speaker.

According to the various embodiments described above, the processor may be configured to allow at least one of at least one syllable, a word including the at least one syllable, or a sentence including the word to correspond to a voice related to the first voice signal.

According to the various embodiments described above, the processor may be configured to control the second electronic device when feature information corresponding to voice information of a user account is included in the first voice signal for the second electronic device having identification information related to the user account.

According to the various embodiments described above, the processor may be configured to register the second electronic device in a specified place at a same location as the electronic device when the first voice signal received from the second electronic device corresponds to the first voice signal obtained by using a microphone included in the electronic device.

According to the various embodiments described above, the processor may be configured to register the second electronic device in another specified place other than the specified place when a signal value of the first voice signal received from the second electronic device is equal to or less than a specified size.

According to the various embodiments described above, a communication method between different electronic devices includes receiving a first voice signal transmitted from a second electronic device to a first electronic device through a communication circuit, and allowing the first electronic device to transmit network connection information for connecting with the server to the second electronic device based on whether the first voice signal corresponds to a second voice signal stored in a memory.

According to the various embodiments described above, the communication method may further include associating identification information of the second electronic device with a user account when the first voice signal corresponds to the second voice signal and feature information of the first voice signal corresponds to voice information of the user account stored in the memory.

According to the various embodiments described above, the communication method may further include associating identification information of the second electronic device with identification information of the first electronic device based on whether the first voice signal obtained from each of the first and second electronic devices corresponds to the second voice signal stored in the memory.

According to the various embodiments described above, the associating of the identification information of the second electronic device and the identification information of the first electronic device may include registering the second electronic device in a specified place when the identification information of the second electronic device is associated with the identification information of the first electronic device.

According to the various embodiments described above, the associating of the identification information of the second electronic device and the identification information of the first electronic device may include registering the second electronic device in another specified place other than the specified place when the first voice signal is transmitted to the second electronic device with a signal value equal to or less than a specified size.

Figure 9:
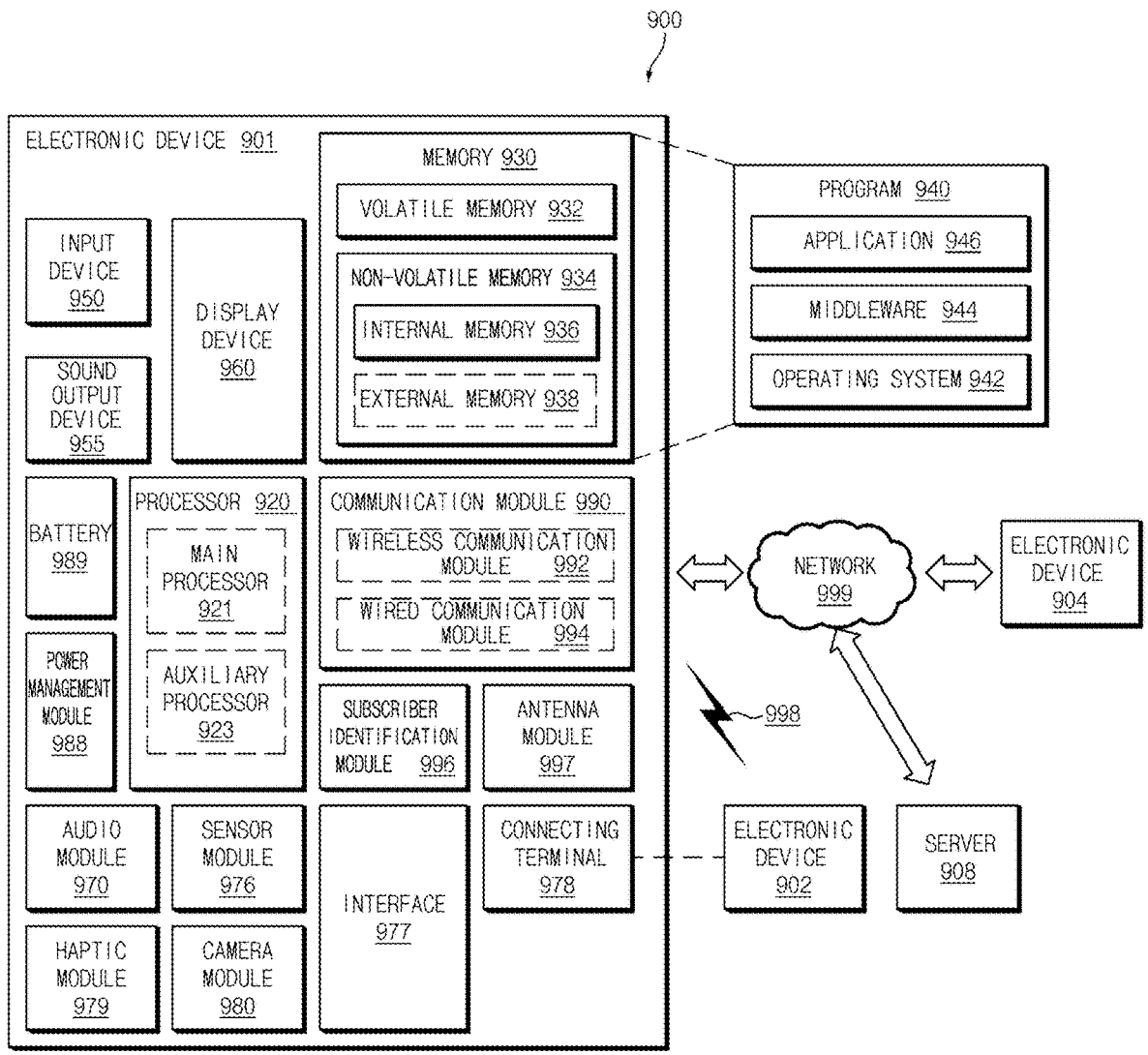
FIG. 9 illustrates a block diagram of an electronic device in a network environment according to various embodiments; and In the description of the drawings, the same or similar reference numerals may be used for the same or similar components.

FIG. 9 illustrates a block diagram of an electronic device 901 in a network environment 900 according to various embodiments.

Referring to FIG. 9, the electronic device 901 in the network environment 900 may communicate with an electronic device 902 via a first network 998 (e.g., a short-range wireless communication network), or an electronic device 904 or a server 908 via a second network 999 (e.g., a long-range wireless communication network). According to an embodiment, the electronic device 901 may communicate with the electronic device 904 via the server 908. According to an embodiment, the electronic device 901 may include a processor 920, memory 930, an input device 950, a sound output device 955, a display device 960, an audio module 970, a sensor module 976, an interface 977, a haptic module 979, a camera module 980, a power management module 988, a battery 989, a communication module 990, a subscriber identification module(SIM) 996, or an antenna module 997. In some embodiments, at least one (e.g., the display device 960 or the camera module 980) of the components may be omitted from the electronic device 901, or one or more other components may be added in the electronic device 901. In some embodiments, some of the components may be implemented as single integrated circuitry. For example, the sensor module 976 (e.g., a fingerprint sensor, an iris sensor, or an illuminance sensor) may be implemented as embedded in the display device 960 (e.g., a display).

The processor 920 may execute, for example, software (e.g., a program 940) to control at least one other component (e.g., a hardware or software component) of the electronic device 901 coupled with the processor 920, and may perform various data processing or computation. According to one embodiment, as at least part of the data processing or computation, the processor 920 may load a command or data received from another component (e.g., the sensor module 976 or the communication module 990) in volatile memory 932, process the command or the data stored in the volatile memory 932, and store resulting data in non-volatile memory 934. According to an embodiment, the processor 920 may include a main processor 921 (e.g., a central processing unit (CPU) or an application processor (AP)), and an auxiliary processor 923 (e.g., a graphics processing unit (GPU), an image signal processor (ISP), a sensor hub processor, or a communication processor (CP)) that is operable independently from, or in conjunction with, the main processor 921. Additionally or alternatively, the auxiliary processor 923 may be adapted to consume less power than the main processor 921, or to be specific to a specified function. The auxiliary processor 923 may be implemented as separate from, or as part of the main processor 921.

The auxiliary processor 923 may control at least some of functions or states related to at least one component (e.g., the display device 960, the sensor module 976, or the communication module 990) among the components of the electronic device 901, instead of the main processor 921 while the main processor 921 is in an inactive (e.g., sleep) state, or together with the main processor 921 while the main processor 921 is in an active state (e.g., executing an application). According to an embodiment, the auxiliary processor 923 (e.g., an image signal processor or a communication processor) may be implemented as part of another component (e.g., the camera module 980 or the communication module 990) functionally related to the auxiliary processor 923.

The memory 930 may store various data used by at least one component (e.g., the processor 920 or the sensor module 976) of the electronic device 901. The various data may include, for example, software (e.g., the program 940) and input data or output data for a command related thereto. The memory 930 may include the volatile memory 932 or the non-volatile memory 934.

The program 940 may be stored in the memory 930 as software, and may include, for example, an operating system (OS) 942, middleware 944, or an application 946.

The input device 950 may receive a command or data to be used by other component (e.g., the processor 920) of the electronic device 901, from the outside (e.g., a user) of the electronic device 901. The input device 950 may include, for example, a microphone, a mouse, a keyboard, or a digital pen (e.g., a stylus pen).

The sound output device 955 may output sound signals to the outside of the electronic device 901. The sound output device 955 may include, for example, a speaker or a receiver. The speaker may be used for general purposes, such as playing multimedia or playing record, and the receiver may be used for an incoming calls. According to an embodiment, the receiver may be implemented as separate from, or as part of the speaker.

The display device 960 may visually provide information to the outside (e.g., a user) of the electronic device 901. The display device 960 may include, for example, a display, a hologram device, or a projector and control circuitry to control a corresponding one of the display, hologram device, and projector. According to an embodiment, the display device 960 may include touch circuitry adapted to detect a touch, or sensor circuitry (e.g., a pressure sensor) adapted to measure the intensity of force incurred by the touch.

The audio module 970 may convert a sound into an electrical signal and vice versa. According to an embodiment, the audio module 970 may obtain the sound via the input device 950, or output the sound via the sound output device 955 or a headphone of an external electronic device (e.g., an electronic device 902) directly (e.g., wiredly) or wirelessly coupled with the electronic device 901.

The sensor module 976 may detect an operational state (e.g., power or temperature) of the electronic device 901 or an environmental state (e.g., a state of a user) external to the electronic device 901, and then generate an electrical signal or data value corresponding to the detected state. According to an embodiment, the sensor module 976 may include, for example, a gesture sensor, a gyro sensor, an atmospheric pressure sensor, a magnetic sensor, an acceleration sensor, a grip sensor, a proximity sensor, a color sensor, an infrared (IR) sensor, a biometric sensor, a temperature sensor, a humidity sensor, or an illuminance sensor.

The interface 977 may support one or more specified protocols to be used for the electronic device 901 to be coupled with the external electronic device (e.g., the electronic device 902) directly (e.g., wiredly) or wirelessly. According to an embodiment, the interface 977 may include, for example, a high definition multimedia interface (HDMI), a universal serial bus (USB) interface, a secure digital (SD) card interface, or an audio interface.

A connecting terminal 978 may include a connector via which the electronic device 901 may be physically connected with the external electronic device (e.g., the electronic device 902). According to an embodiment, the connecting terminal 978 may include, for example, a HDMI connector, a USB connector, a SD card connector, or an audio connector (e.g., a headphone connector).

The haptic module 979 may convert an electrical signal into a mechanical stimulus (e.g., a vibration or a movement) or electrical stimulus which may be recognized by a user via his tactile sensation or kinesthetic sensation. According to an embodiment, the haptic module 979 may include, for example, a motor, a piezoelectric element, or an electric stimulator.

The camera module 980 may capture a still image or moving images. According to an embodiment, the camera module 980 may include one or more lenses, image sensors, image signal processors, or flashes.

The power management module 988 may manage power supplied to the electronic device 901. According to one embodiment, the power management module 988 may be implemented as at least part of, for example, a power management integrated circuit (PMIC).

The battery 989 may supply power to at least one component of the electronic device 901. According to an embodiment, the battery 989 may include, for example, a primary cell which is not rechargeable, a secondary cell which is rechargeable, or a fuel cell.

The communication module 990 may support establishing a direct (e.g., wired) communication channel or a wireless communication channel between the electronic device 901 and the external electronic device (e.g., the electronic device 902, the electronic device 904, or the server 908) and performing communication via the established communication channel. The communication module 990 may include one or more communication processors that are operable independently from the processor 920 (e.g., the application processor (AP)) and supports a direct (e.g., wired) communication or a wireless communication. According to an embodiment, the communication module 990 may include a wireless communication module 992 (e.g., a cellular communication module, a short-range wireless communication module, or a global navigation satellite system (GNSS) communication module) or a wired communication module 994 (e.g., a local area network (LAN) communication module or a power line communication (PLC) module). A corresponding one of these communication modules may communicate with the external electronic device via the first network 998 (e.g., a short-range communication network, such as Bluetooth™, wireless-fidelity (Wi-Fi) direct, or infrared data association (IrDA)) or the second network 999 (e.g., a long-range communication network, such as a cellular network, the Internet, or a computer network (e.g., LAN or wide area network (WAN)). These various types of communication modules may be implemented as a single component (e.g., a single chip), or may be implemented as multi components (e.g., multi chips) separate from each other. The wireless communication module 992 may identify and authenticate the electronic device 901 in a communication network, such as the first network 998 or the second network 999, using subscriber information (e.g., international mobile subscriber identity (IMSI)) stored in the subscriber identification module 996.

The antenna module 997 may transmit or receive a signal or power to or from the outside (e.g., the external electronic device) of the electronic device 901. According to an embodiment, the antenna module 997 may include an antenna including a radiating element composed of a conductive material or a conductive pattern formed in or on a substrate (e.g., PCB). According to an embodiment, the antenna module 997 may include a plurality of antennas. In such a case, at least one antenna appropriate for a communication scheme used in the communication network, such as the first network 998 or the second network 999, may be selected, for example, by the communication module 990 (e.g., the wireless communication module 992) from the plurality of antennas. The signal or the power may then be transmitted or received between the communication module 990 and the external electronic device via the selected at least one antenna. According to an embodiment, another component (e.g., a radio frequency integrated circuit (RFIC)) other than the radiating element may be additionally formed as part of the antenna module 997.

At least some of the above-described components may be coupled mutually and communicate signals (e.g., commands or data) therebetween via an inter-peripheral communication scheme (e.g., a bus, general purpose input and output (GPIO), serial peripheral interface (SPI), or mobile industry processor interface (MIPI)).

According to an embodiment, commands or data may be transmitted or received between the electronic device 901 and the external electronic device 904 via the server 908 coupled with the second network 999. Each of the electronic devices 902 and 904 may be a device of a same type as, or a different type, from the electronic device 901. According to an embodiment, all or some of operations to be executed at the electronic device 901 may be executed at one or more of the external electronic devices 902, 904, or 908. For example, if the electronic device 901 should perform a function or a service automatically, or in response to a request from a user or another device, the electronic device 901, instead of, or in addition to, executing the function or the service, may request the one or more external electronic devices to perform at least part of the function or the service. The one or more external electronic devices receiving the request may perform the at least part of the function or the service requested, or an additional function or an additional service related to the request, and transfer an outcome of the performing to the electronic device 901. The electronic device 901 may provide the outcome, with or without further processing of the outcome, as at least part of a reply to the request. To that end, a cloud computing, distributed computing, or client-server computing technology may be used, for example.

The electronic device according to various embodiments may be one of various types of electronic devices. The electronic devices may include, for example, a portable communication device (e.g., a smartphone), a computer device, a portable multimedia device, a portable medical device, a camera, a wearable device, or a home appliance. According to an embodiment of the disclosure, the electronic devices are not limited to those described above.

It should be appreciated that various embodiments of the present disclosure and the terms used therein are not intended to limit the technological features set forth herein to particular embodiments and include various changes, equivalents, or replacements for a corresponding embodiment. With regard to the description of the drawings, similar reference numerals may be used to refer to similar or related elements. It is to be understood that a singular form of a noun corresponding to an item may include one or more of the things, unless the relevant context clearly indicates otherwise. As used herein, each of such phrases as "A or B", "at least one of A and B", "at least one of A or B", "A, B, or C", "at least one of A, B, and C", and "at least one of A, B, or C" may include any one of, or all possible combinations of the items enumerated together in a corresponding one of the phrases. As used herein, such terms as "1st" and "2nd", or "first" and "second" may be used to simply distinguish a corresponding component from another, and does not limit the components in other aspect (e.g., importance or order). It is to be understood that if an element (e.g., a first element) is referred to, with or without the term "operatively" or "communicatively", as "coupled with", "coupled to", "connected with", or "connected to" another element (e.g., a second element), it means that the element may be coupled with the other element directly (e.g., wiredly), wirelessly, or via a third element.

As used herein, the term "module" may include a unit implemented in hardware, software, or firmware, and may interchangeably be used with other terms, for example, "logic", "logic block", "part", or "circuitry". A module may be a single integral component, or a minimum unit or part thereof, adapted to perform one or more functions. For example, according to an embodiment, the module may be implemented in a form of an application-specific integrated circuit (ASIC).

Various embodiments as set forth herein may be implemented as software (e.g., the program 940) including one or more instructions that are stored in a storage medium (e.g., internal memory 936 or external memory 938) that is readable by a machine (e.g., the electronic device 901). For example, a processor (e.g., the processor 920) of the machine (e.g., the electronic device 901) may invoke at least one of the one or more instructions stored in the storage medium, and execute it, with or without using one or more other components under the control of the processor. This allows the machine to be operated to perform at least one function according to the at least one instruction invoked. The one or more instructions may include a code generated by a compiler or a code executable by an interpreter. The machine-readable storage medium may be provided in the form of a non-transitory storage medium. Wherein, the term "non-transitory" simply means that the storage medium is a tangible device, and does not include a signal (e.g., an electromagnetic wave), but this term does not differentiate between where data is semi-permanently stored in the storage medium and where the data is temporarily stored in the storage medium.

According to an embodiment, a method according to various embodiments of the disclosure may be included and provided in a computer program product. The computer program product may be traded as a product between a seller and a buyer. The computer program product may be distributed in the form of a machine-readable storage medium (e.g., compact disc read only memory (CD-ROM)), or be distributed (e.g., downloaded or uploaded) online via an application store (e.g., PlayStore™), or between two user devices (e.g., smart phones) directly. If distributed online, at least part of the computer program product may be temporarily generated or at least temporarily stored in the machine-readable storage medium, such as memory of the manufacturer's server, a server of the application store, or a relay server.

According to various embodiments, each component (e.g., a module or a program) of the above-described components may include a single entity or multiple entities. According to various embodiments, one or more of the above-described components may be omitted, or one or more other components may be added. Alternatively or additionally, a plurality of components (e.g., modules or programs) may be integrated into a single component. In such a case, according to various embodiments, the integrated component may still perform one or more functions of each of the plurality of components in the same or similar manner as they are performed by a corresponding one of the plurality of components before the integration. According to various embodiments, operations performed by the module, the program, or another component may be carried out sequentially, in parallel, repeatedly, or heuristically, or one or more of the operations may be executed in a different order or omitted, or one or more other operations may be added.

According to the embodiments of the disclosure, by allowing the IoT device to be registered in the intelligent server based on the input corresponding to the user's utterance, it is possible to simplify the movement of the user's body.

In addition, according to the embodiments of the disclosure, in the process of registering an IoT device in the intelligent server, it is possible to simplify the movement of a user so that the greater number of IoT devices may be registered in the intelligent server at the same time.

In addition, various effects that are directly or indirectly understood through the present disclosure may be provided.

Although the present disclosure has been described with various embodiments, various changes and modifications may be suggested to one skilled in the art. It is intended that the present disclosure encompass such changes and modifications as fall within the scope of the appended claims.

What is claimed is:

1. An intelligent server for supporting a communication environment between different electronic devices, the intelligent server comprising:
a communication circuit;
a memory; and
a processor electrically connected to the communication circuit and the memory, wherein the processor is configured to:
receive, from a first electronic device, a first voice signal transmitted from a second electronic device to the first electronic device through the communication circuit, and
allow the first electronic device to transmit network connection information for connecting with the intelligent server to the second electronic device based on whether the first voice signal corresponds to a second voice signal stored in the memory.

2. The intelligent server of claim 1, wherein the processor is further configured to:
allow the first electronic device to transmit the network connection information to the second electronic device in response to a determination that the first voice signal from the first electronic device corresponds to the second electronic device.

3. The intelligent server of claim 1, wherein the processor is further configured to:
associate identification information of the second electronic device with a user account when the first voice signal corresponds to the second voice signal and feature information of the first voice signal corresponds to voice information of the user account stored in the memory.

4. The intelligent server of claim 3, wherein the processor is further configured to:
assign access authority to the second electronic device to the user account associated with the identification information of the second electronic device.

5. The intelligent server of claim 1, wherein the processor is further configured to:
associate identification information of the second electronic device with identification information of the first electronic device based on whether the first voice signal obtained from each of the first and second electronic devices corresponds to the second voice signal stored in the memory.

6. The intelligent server of claim 5, wherein the processor is further configured to:
   register the second electronic device in a specified place when the identification information of the second electronic device is associated with the identification information of the first electronic device.

7. The intelligent server of claim 6, wherein the processor is further configured to:
   register the second electronic device in another specified place other than the specified place when the first voice signal is transmitted to the second electronic device with a signal value equal to or less than a specified size.

8. The intelligent server of claim 7, wherein the processor is further configured to:
   associate the identification information of the second electronic device with identification information of another first electronic device when the first voice signal is received by the other first electronic device located in the other specified place.

9. An electronic device for supporting a communication environment between different electronic devices, the electronic device comprising:
   a communication circuit; and
   a processor electrically connected to the communication circuit, wherein the processor is configured to:
   transmit a first voice signal received from a second electronic device to an intelligent server through the communication circuit, and
   receive, from the intelligent server, network connection information for connection with the intelligent server, and
   transmit, to the second electronic device, the network connection information based on whether the first voice signal corresponds to a second voice signal stored in a memory of the intelligent server.

10. The electronic device of claim 9, wherein the processor is further configured to:
    transmit a wake-up signal for switching a microphone included in the second electronic device to an activation mode to the second electronic device when an acknowledgment (ACK) for a transmission signal of the electronic device is received from the second electronic device through the communication circuit.

11. The electronic device of claim 9, further comprising: a speaker,
    wherein the processor is configured to output voice data related to the first voice signal through the speaker.

12. The electronic device of claim 11, wherein the processor is further configured to:
    allow at least one of at least one syllable, a word including the at least one syllable, or a sentence including the word to correspond to a voice related to the first voice signal.

13. The electronic device of claim 9, wherein the processor is further configured to:
    control the second electronic device when feature information corresponding to voice information of a user account is included in the first voice signal for the second electronic device including identification information related to the user account.

14. The electronic device of claim 9, wherein the processor is further configured to:
    register the second electronic device in a specified place at a same location as the electronic device when the first voice signal received from the second electronic device corresponds to the first voice signal obtained by using a microphone included in the electronic device.

15. The electronic device of claim 14, wherein the processor is further configured to:
    register the second electronic device in another specified place other than the specified place when a signal value of the first voice signal received from the second electronic device is equal to or less than a specified size.

16. A communication method between different electronic devices comprising:
    receiving, from a first electronic device, a first voice signal transmitted from a second electronic device to the first electronic device through a communication circuit; and
    allowing the first electronic device to transmit network connection information for connecting with an intelligent server to the second electronic device based on whether the first voice signal corresponds to a second voice signal stored in a memory.

17. The communication method of claim 16, further comprising:
    associating identification information of the second electronic device with a user account when the first voice signal corresponds to the second voice signal and feature information of the first voice signal corresponds to voice information of the user account stored in the memory.

18. The communication method of claim 16, further comprising:
    associating identification information of the second electronic device with identification information of the first electronic device based on whether the first voice signal obtained from each of the first and second electronic devices corresponds to the second voice signal stored in the memory.

19. The communication method of claim 18, wherein the associating of the identification information of the second electronic device and the identification information of the first electronic device includes:
    registering the second electronic device in a specified place when the identification information of the second electronic device is associated with the identification information of the first electronic device.

20. The communication method of claim 18, wherein the associating of the identification information of the second electronic device and the identification information of the first electronic device includes:
    registering the second electronic device in another specified place other than the specified place when the first voice signal is transmitted to the second electronic device with a signal value equal to or less than a specified size.

* * * * *